United States Patent
Sasajima et al.

(10) Patent No.: US 7,884,322 B2
(45) Date of Patent: Feb. 8, 2011

(54) SCANNING ELECTRON MICROSCOPE AND A METHOD FOR PATTERN COMPOSITE INSPECTION USING THE SAME

(75) Inventors: Fumihiro Sasajima, Hitachinaka (JP); Saori Kato, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 468 days.

(21) Appl. No.: 11/976,968

(22) Filed: Oct. 30, 2007

(65) Prior Publication Data

US 2008/0099676 A1      May 1, 2008

(30) Foreign Application Priority Data

Oct. 31, 2006    (JP)    .............................. 2006-296062

(51) Int. Cl.
- *G01N 23/00* (2006.01)
- *G21K 7/00* (2006.01)
- *G06K 9/00* (2006.01)

(52) U.S. Cl. ...................... 250/306; 250/307; 250/310; 382/145; 382/149

(58) Field of Classification Search ................. 250/306, 250/307, 310; 382/147, 181, 190, 199, 218, 382/219; 700/110
See application file for complete search history.

(56) References Cited

U.S. PATENT DOCUMENTS

| | | | | |
|---|---|---|---|---|
| 4,547,895 A * | 10/1985 | Mita et al. | ................... | 382/144 |
| 4,651,341 A * | 3/1987 | Nakashima et al. | ......... | 382/145 |
| 4,692,943 A * | 9/1987 | Pietzsch et al. | ............. | 382/148 |
| 4,908,872 A * | 3/1990 | Toriu et al. | ................... | 382/197 |
| 5,046,113 A | 9/1991 | Hoki | | |
| 5,663,893 A * | 9/1997 | Wampler et al. | ............ | 382/144 |
| 5,887,080 A * | 3/1999 | Tsubusaki et al. | ........... | 382/147 |
| 6,140,644 A * | 10/2000 | Kawanami et al. | .......... | 250/310 |
| 6,282,309 B1 * | 8/2001 | Emery | ........................ | 382/145 |
| 6,288,780 B1 * | 9/2001 | Fairley et al. | ............ | 356/237.1 |
| 6,373,053 B1 * | 4/2002 | Choo et al. | ................. | 250/310 |
| 6,381,365 B2 * | 4/2002 | Murakawa | .................. | 382/190 |
| 6,396,943 B2 * | 5/2002 | Yamashita | .................. | 382/144 |
| 6,452,677 B1 * | 9/2002 | Do et al. | ..................... | 250/310 |
| 6,456,736 B1 * | 9/2002 | Su et al. | ..................... | 382/147 |
| 6,486,492 B1 * | 11/2002 | Su | ............................. | 250/307 |

(Continued)

FOREIGN PATENT DOCUMENTS

JP     5-46734     2/1993

(Continued)

*Primary Examiner*—Robert Kim
*Assistant Examiner*—Brooke Purinton
(74) *Attorney, Agent, or Firm*—McDermott Will & Emery LLP

(57) ABSTRACT

A scanning electron microscope capable of performing alone the critical dimension measurement and the defect inspection is provided. The scanning electron microscope has a reference image storage unit for storing a reference image transcribing a reference pattern, an inspected image pick-up unit for picking up, on the basis of the reference image, an inspected image transcribing an inspection pattern which pattern-matches with the reference pattern, a critical dimension measuring unit for measuring critical dimensions of the inspection pattern by using the inspected image, and a defect inspection unit for performing an inspection of a defect inside or outside the inspection pattern by comparing the reference image with the inspected image.

9 Claims, 29 Drawing Sheets

U.S. PATENT DOCUMENTS

| | | | | |
|---|---|---|---|---|
| 6,512,227 B2 * | 1/2003 | Iwabuchi et al. | ............ | 250/310 |
| 6,647,147 B1 * | 11/2003 | Miyano | ............ | 382/199 |
| 6,693,278 B2 * | 2/2004 | Maas et al. | ............ | 250/310 |
| 6,925,202 B2 * | 8/2005 | Karklin et al. | ............ | 382/145 |
| 6,965,687 B2 * | 11/2005 | Sawa et al. | ............ | 382/149 |
| 7,012,439 B2 * | 3/2006 | Pinto et al. | ............ | 324/751 |
| 7,116,817 B2 * | 10/2006 | Tanaka et al. | ............ | 382/149 |
| 7,133,549 B2 * | 11/2006 | Eran et al. | ............ | 382/144 |
| 7,133,550 B2 * | 11/2006 | Hiroi et al. | ............ | 382/145 |
| 7,253,645 B2 * | 8/2007 | Talbot et al. | ............ | 250/310 |
| 7,265,382 B2 * | 9/2007 | Lymberopoulos et al. | ... | 250/310 |
| 7,297,949 B2 * | 11/2007 | Nakasuji et al. | ............ | 250/307 |
| 7,408,155 B2 * | 8/2008 | Oosaki et al. | ............ | 250/310 |
| 7,457,453 B2 * | 11/2008 | Hiroi et al. | ............ | 382/145 |
| 7,796,801 B2 * | 9/2010 | Kitamura et al. | ............ | 382/141 |
| 2002/0024021 A1 * | 2/2002 | Iwabuchi et al. | ......... | 250/492.3 |
| 2002/0028013 A1 * | 3/2002 | Sawa et al. | ............ | 382/147 |
| 2002/0164064 A1 * | 11/2002 | Karklin et al. | ............ | 382/145 |
| 2002/0166964 A1 * | 11/2002 | Talbot et al. | ............ | 250/307 |
| 2002/0190207 A1 * | 12/2002 | Levy et al. | ............ | 250/306 |
| 2005/0127292 A1 * | 6/2005 | Kang et al. | ............ | 250/310 |
| 2005/0226494 A1 * | 10/2005 | Yamamoto et al. | ......... | 382/149 |
| 2006/0036979 A1 * | 2/2006 | Zurbrick et al. | ............ | 382/144 |
| 2006/0060781 A1 * | 3/2006 | Watanabe et al. | ............ | 250/310 |
| 2006/0231753 A1 * | 10/2006 | Kang et al. | ............ | 250/307 |
| 2006/0289755 A1 * | 12/2006 | Koyama et al. | ............ | 250/310 |

FOREIGN PATENT DOCUMENTS

| | | |
|---|---|---|
| JP | 7-37892 | 4/1995 |
| JP | 2000-183122 | 6/2000 |

* cited by examiner

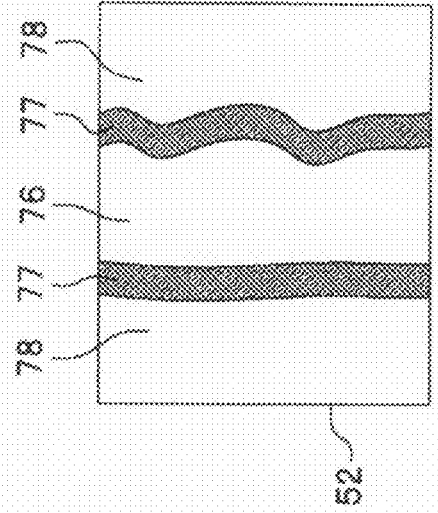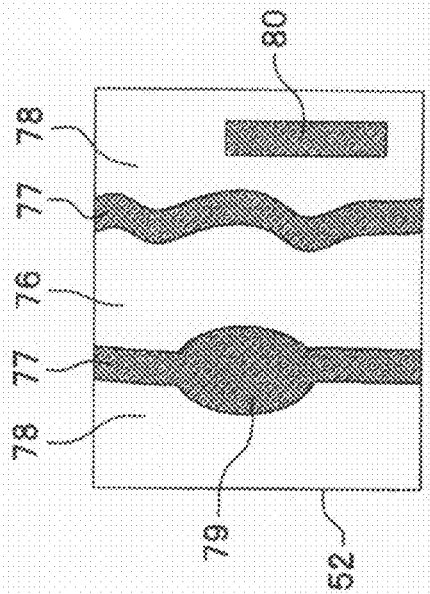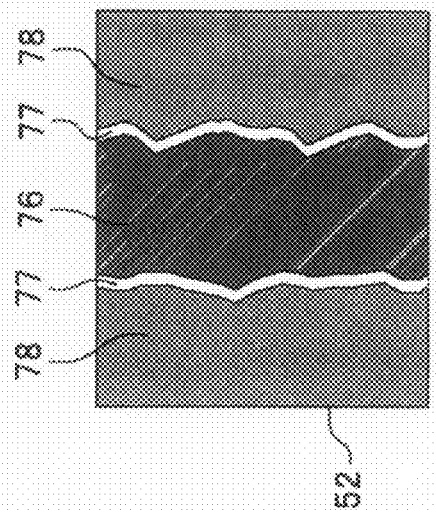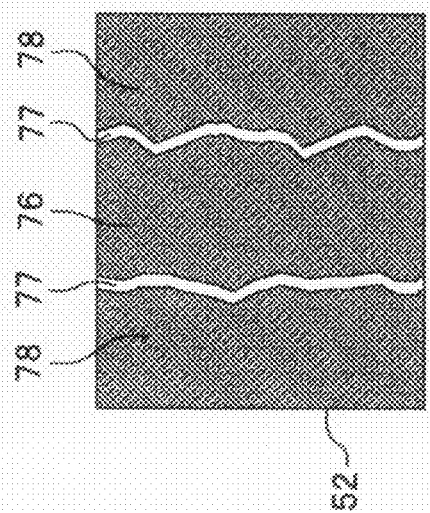

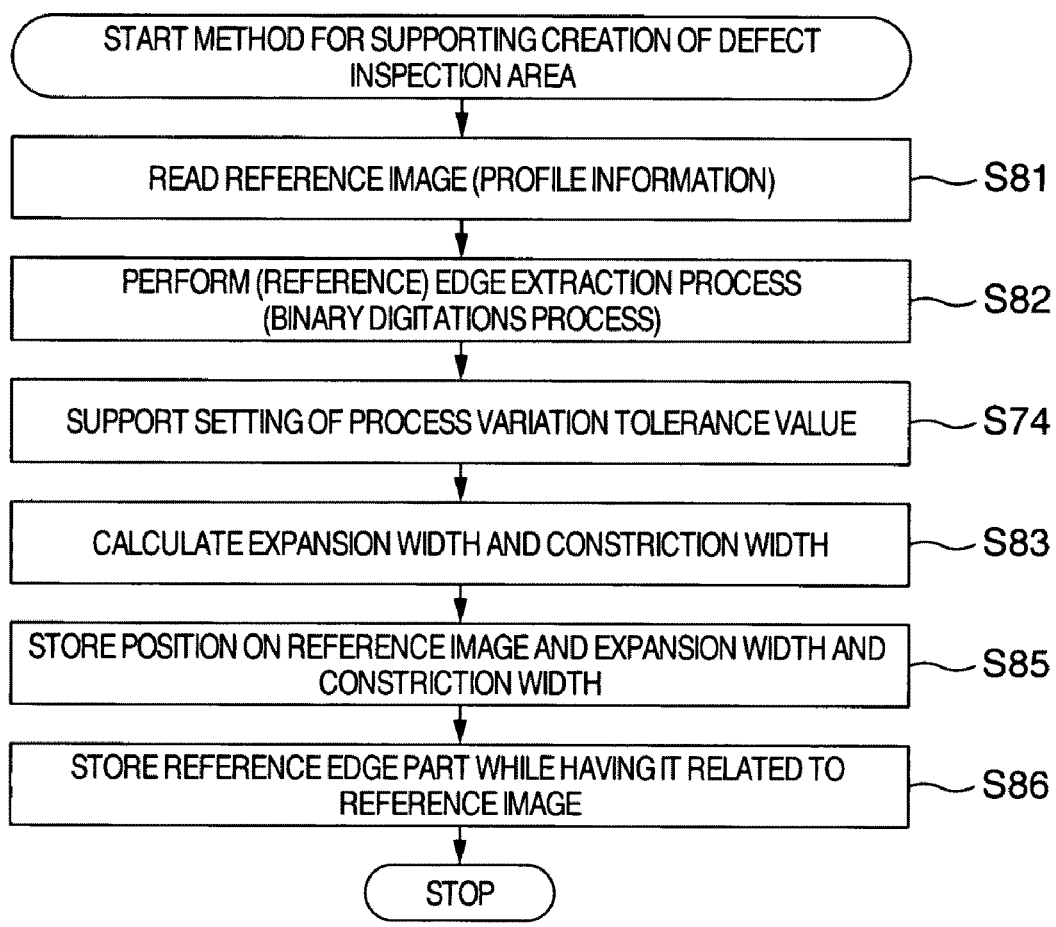

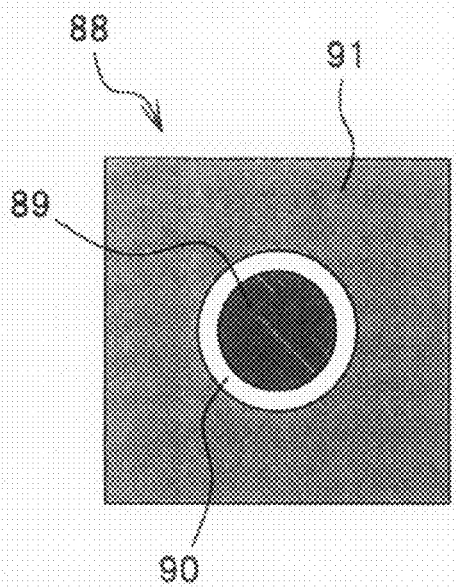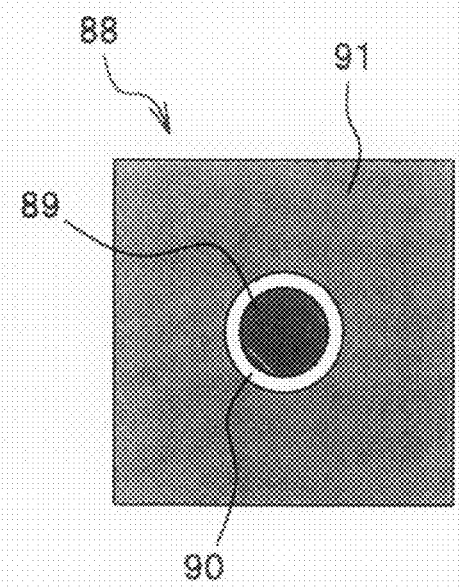

SCANNING ELECTRON MICROSCOPE AND A METHOD FOR PATTERN COMPOSITE INSPECTION USING THE SAME

CLAIM OF PRIORITY

This application claims the benefit of Japanese Patent Application No. JP 2006-296062, filed on Oct. 31, 2006, the disclosure of which is incorporated herein by reference.

BACKGROUND OF THE INVENTION

The present invention relates to a scanning electron microscope and pattern composite inspection using the same.

In recent years, with such devices as semiconductor devices highly integrated and miniaturized, the width of a line pattern and the hole diameter of a hole pattern in the semiconductor device have been sized to 100 nm or less and a scanning electron microscope has been used exclusively for measuring critical dimensions of these constituent factors. On the other hand, in inspecting defects of the line pattern and the like, the measurement over the entire surface of a wafer within a short period of time is needed and therefore it suffices that the presence or absence of defects only is first known, without requiring the measurement of the accurate size of a defect, so that for defect inspection, the scanning electron microscope is not always employed but an optical microscope is used principally. It is to be noted that in the defect inspection, as a wide use method applicable to the optical microscope and the scanning electron microscope as well, a comparative inspection method and a method for setting up an area in which the inspection is stopped have been proposed as described in, for example, JP-B-7-37892, JP-A-5-46734 and JP-A-2000-183122.

Conceivably, as the high integration and miniaturization in the semiconductor device further advances in the future, the scanning electron microscope will be used also for the defect inspection. In that case, the critical dimension measurement cannot be considered as also filling the role of the defect inspection. This is because when, for example, a fine foreign matter generated in the preceding process step is deposited on the periphery of a line pattern or there occurs such a defect that a line pattern is partly deficient, the foreign matter/defect will not sometimes be reflected in the result of critical dimension measurement. The foreign matter/defect, however, greatly affects the performance of the semiconductor device and the like. Accordingly, a separate or independent defect inspection based on the scanning electron microscope is considered to be necessary.

But, expectantly, much time will be consumed to perform an independent defect inspection for the whole of a wafer, for example, and the defect inspection is substantially difficult to practice. On the other hand, in consideration of the fact that the critical dimensions have been measured by the scanning electron microscope, possible execution of the critical dimension measurement and the defect inspection as well with a single scanning electron microscope will be preferable for convenience sake.

SUMMARY OF THE INVENTION

Accordingly, it is an object of the present invention to provide a scanning election microscope capable of performing alone the critical dimension measurement and the defect inspection and a method for pattern composite inspection using the same.

To accomplish the above object, according to the present invention, a scanning electron microscope comprises a reference image storage unit for storing a reference image transcribing a reference pattern, an inspected image pick-up unit for picking up, on the basis of the reference image, an inspected image transcribing an inspection pattern which pattern-matches with the reference pattern, a critical dimension measuring unit for measuring critical dimensions of the inspection pattern by using the inspected image, and a defect inspection unit for inspecting a defect inside or outside the inspection pattern by comparing the reference image with the inspected image.

According to the present invention, a method for pattern composite inspection using a scanning electron microscope comprises the steps of storing a reference image transcribing a reference pattern, picking up, by means of the scanning electron microscope on the basis of the reference image, an inspected image transcribing an inspection pattern which pattern-matches with the reference pattern, measuring critical dimensions of the inspection pattern by using the inspected image and inspecting a defect inside or outside the inspection pattern by comparing the reference image and the inspected image.

According to the invention, the scanning electron microscope capable of performing alone the critical dimension measurement and the defect inspection can be provided and besides, the method for pattern composite inspection using the scanning election microscope which can perform alone the critical dimension measurement and the defect inspection can be provided.

Other objects, features and advantages of the invention will become apparent from the following description of the embodiments of the invention taken in conjunction with the accompanying drawings.

BRIEF DESCRIPTION OF THE DRAWINGS

FIG. 18A is a diagram illustrating a reference image.

FIG. 18B is a diagram illustrating a reference image subjected to an edge extraction process.

FIG. 18C is a diagram illustrating a reference image subjected to a constriction/expansion process.

FIG. 18D is a diagram illustrating a reference image set up with an inspection area of a patternized shape and a non-inspection area of patternized shape.

FIG. 19 is a flowchart of a fourth method for supporting creation of a defect inspection area.

FIG. 32A is a diagram illustrating a reference (or inspected) image (SEM image) of a hole pattern having a large opening diameter.

FIG. 32B is a diagram illustrating a reference (or inspected) image (SEM image) of a hole pattern having a small opening diameter.

DESCRIPTION OF THE INVENTION

Figure 1:
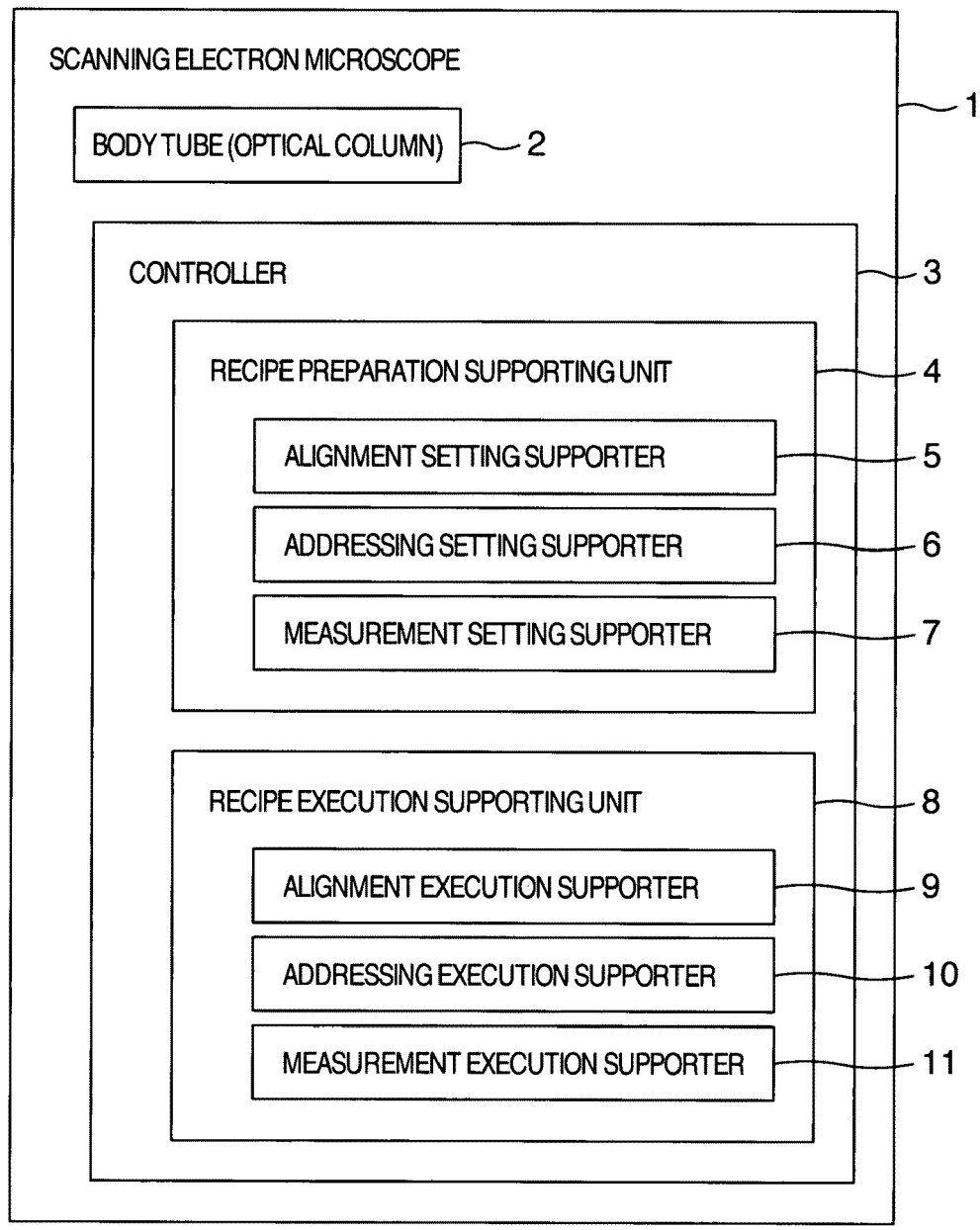
FIG. 1 is a diagram showing the construction of a scanning electron microscope according to an embodiment of the present invention.

The present invention will now be described by way of example with reference to the accompanying drawings. Components common to the drawings are designated by identical reference numerals for avoidance of prolixity.

Referring first to FIG. 1, a scanning electron microscope 1 according to an embodiment of the present invention has a body tube (optical column) 2 and a controller 3. The body tube 2 can observe directly a wafer formed with a plurality of semiconductor devices or the like. The controller 3 includes a recipe preparation supporting unit 4 and a recipe execution supporting unit 8. The recipe preparation supporting unit 4 backs up or supports preparation of a composite inspection recipe by a user of the scanning electron microscope 1. The recipe execution supporting unit 8 supports or backs up the user in executing the composite inspection recipe by using the scanning electron microscope 1. The composite inspection recipe signifies a procedure for proceeding with a composite inspection through which a plurality of inspections of the critical dimension measurement and the defect inspection are executed. In the composite inspection, a wafer as a whole is put in the body tube 2, a particular semiconductor device is selected from plural ones inside the wafer, a particular pattern is also chosen from the selected semiconductor device and the width or the like of the pattern is measured to inspect a defect of the pattern or a defect in the neighborhood of the pattern. Since the composite inspection is carried out using the single scanning electron microscope 1, the user prepares, as a composite inspection recipe, a flow of a series of working operations in the composite inspection, stores the recipe in the scanning electron microscope 1 and upon execution of the composite inspection, reads the composite inspection recipe from the scanning electron microscope 1 to execute the composite inspection in accord with the composite inspection recipe by using the scanning electron microscope 1. Then, on account of the fact that the scanning electron microscope 1, particularly, the recipe preparation supporting unit 4 supports the preparation of a sophisticated composite inspection recipe, the user can prepare the composite inspection recipe with ease. Further, thanks to supporting the execution of the sophisticated composite inspection recipe by the scanning electron microscope 1, particularly, the recipe execution supporting unit 8, the user can easily execute the composite inspection recipe.

The recipe preparation supporting unit 4 has an alignment setting supporter 5, an addressing setting supporter 6 and a measurement setting supporter 7. In a composite inspection, an inspection wafer to be inspected, as a whole, is put in the body tube 2 and positioned therein. Then, for positioning of the wafer in the body tube 2, the alignment setting supporter 5 uses a reference wafer for reference purpose shaped identically to the inspection wafer to support storing of two points on the wafer which correspond to two points in the body tube. Specifically, the alignment setting supporter 5 gives the user a display of an image in the neighborhood of the two points on the reference wafer and urges the user to designate the two points through a GUI. Then, an image and position coordinates of the designated two points are stored.

The addressing setting supporter 6 supports or backs up the user in selecting a particular semiconductor device from the plural ones inside the reference wafer. More specifically, the addressing setting supporter 6 gives the user a map of the semiconductor devices inside the reference wafer and urges the user to designate a semiconductor device to be inspected through the GUI. Then, position coordinates of the designated semiconductor device are stored.

The measurement setting supporter 7 supports the user in selecting a particular pattern from the semiconductor device. Also, it supports the user in setting a condition of measurement for measuring the width or the like of the pattern. Furthermore, it supports the user in setting a defect inspection condition for performing an inspection of a defect of the pattern or a defect in the neighborhood of the pattern. More particularly, the measurement setting supporter 7 gives the user a display of an SEM image of the semiconductor device and urges the user to designate, through the GUI, an SEM image of an area containing the particular pattern as a reference image. Then, the designated reference image and position coordinates of its pattern are stored. The measurement setting supporter 7 gives the user a display of the reference image and urges the user to designate a measurement condition for a critical dimension measurement portion of the particular pattern through the GUI. Then, the designated measurement condition is stored while being related to the reference image. Further, the measurement setting supporter 7 gives the user a display of the reference image and urges the user to designates, through the GUI, an inspection area to be inspected and a defect inspection condition such as the size of a defect to be inspected. Then, the designated defect inspection condition is stored while being related to the reference image.

The recipe execution supporting unit 8 has an alignment execution supporter 9, an addressing execution supporter 10 and a measurement execution supporter 11. In the recipe execution supporting unit 8, the inspection wafer is actually inspected.

In order to position the inspection wafer in the body tube 2, the alignment execution supporter 9 reads the two points on the reference wafer which have been stored by means of the alignment setting supporter 5 to display them to the user, performs positioning based on pattern matching to display, to the user, two points on the inspection wafer which correspond to the two points on the reference wafer, thus urging the user to decide whether the position matching is acceptable or rejectable. When the user applies an input indicative of rejection, the pattern matching is carried out reiteratively until a determination of acceptance is issued. With the acceptance determination inputted, the execution of alignment ends.

The addressing execution supporter 10 reads the position coordinates of the semiconductor device stored by means of the addressing setting supporter 6 and moves the inspection wafer in the body tube 2 so that an SEM image of the semiconductor device can be obtained.

The measurement execution supporter 11 reads the reference image and the position coordinates of the pattern which have been stored by means of the measurement setting supporter 7 and gives the user an SEM image containing the corresponding pattern as an inspected image. The measurement execution supporter 11 reads the measurement condition stored by means of the measurement setting supporter 7, takes critical dimensions of an inspection pattern transcribed in the inspected image and stores the result of critical dimension measurement, followed by displaying the critical dimension measurement result to the user and urging the user to decide whether the critical dimension measurement is to be settled or unsettled. When the user inputs an unsettlement, the critical dimension measurement is carried out reiteratively until a determination of settlement is obtained. With a settlement determination inputted, the execution of critical dimension measurement ends. The measurement execution supporter 11 reads the reference image and the defect inspection condition which have been stored by means of the measurement setting supporter 7, compares the reference image with the inspected image on the basis of the defect inspection condition to perform a defect inspection by which the difference is determined as a defect and stores the result of defect inspection. The defect inspection result is displayed to the user, urging the user to decide settlement/unsettlement of the defect inspection. With an unsettlement inputted by the user, the defect inspection is carried out reiteratively until a determination of settlement is obtained. When a settlement determination is inputted, the execution of defect inspection ends.

Figure 2:
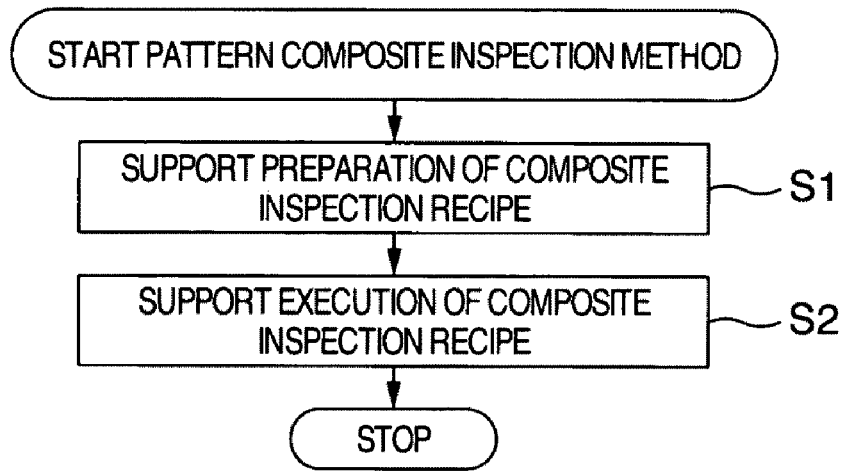
FIG. 2 is a flowchart of a method for pattern composite inspection according to an embodiment of the invention.

Turning to FIG. 2, in the pattern composite inspection method using the scanning electron microscope according to the embodiment of the present invention, the recipe preparation supporting unit 4 first supports or backs up, in step S1, the user of scanning electron microscope 1 in preparing the composite inspection recipe. Next, in step S2, the recipe execution supporting unit 8 supports the user in executing the composite inspection recipe by using the scanning electron microscope 1.

Figure 3:
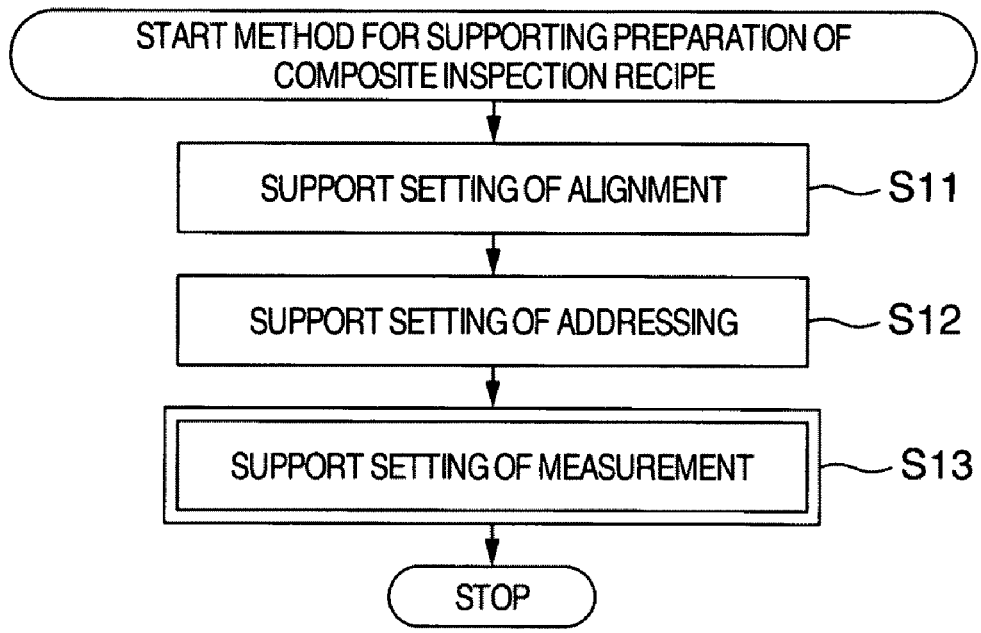
FIG. 3 is a flowchart of a method for supporting (backing up) preparation of a composite inspection recipe.

As shown in FIG. 3, to fulfill the step S1 in FIG. 2 of supporting preparation of the composite inspection recipe, the alignment setting supporter 5 first performs, in step S11, the aforementioned support of setting of alignment. Subsequently, in step S12, the addressing setting supporter 6 supports the aforementioned setting of addressing. Finally, in step S13, the measurement setting supporter 7 supports the aforementioned setting of measurement.

Figure 4:
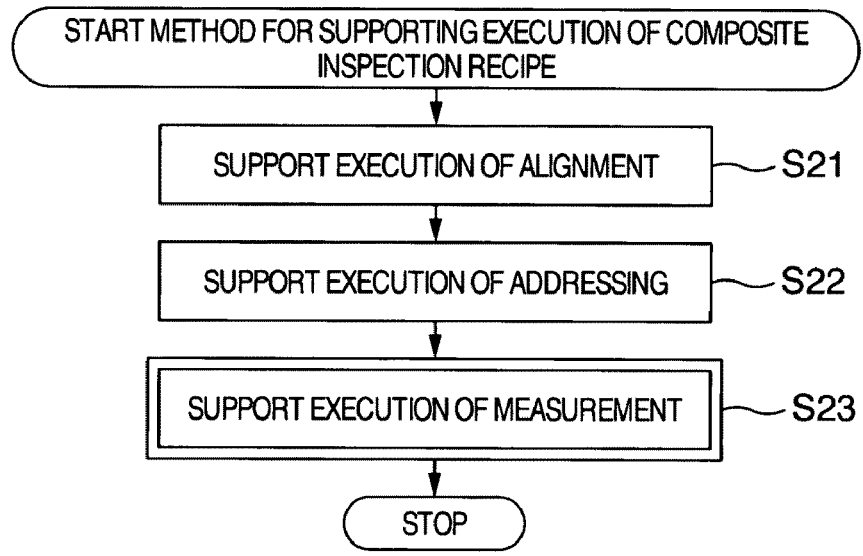
FIG. 4 is a flowchart of a method for supporting execution of the composite inspection recipe.

As shown in FIG. 4, to fulfill the step S2 in FIG. 2 of supporting execution of the composite inspection recipe, the alignment execution supporter 9 first supports, in step S21, the aforementioned execution of alignment. Next, in step S22, the addressing execution supporter 10 supports the aforementioned execution of addressing. Finally, in step S23, the measurement execution supporter 11 supports the aforementioned execution of measurement.

Figure 5:
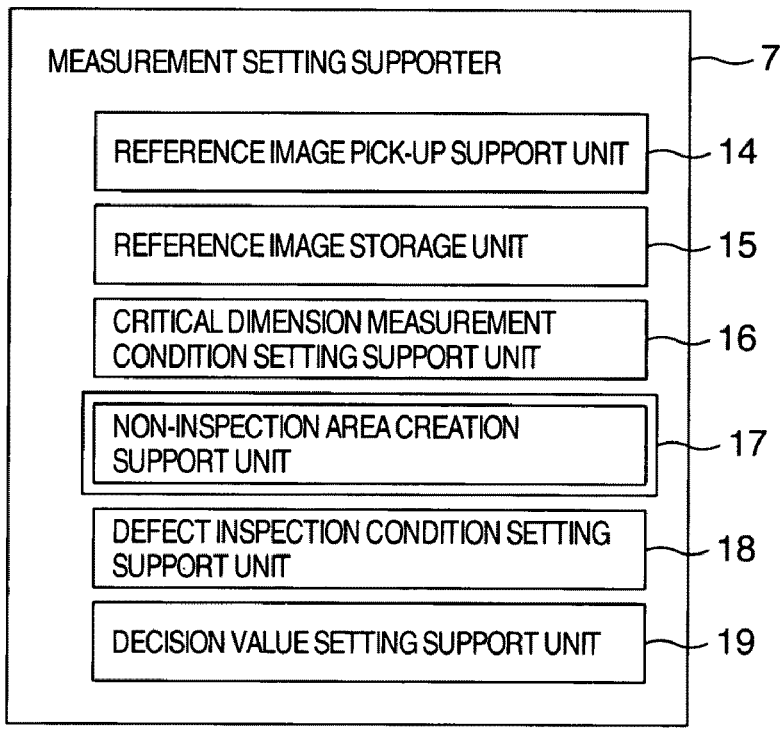
FIG. 5 is a diagram showing the construction of a measurement setting supporter.

Turning to FIG. 5, the measurement setting supporter 7 in FIG. 1 has a reference image pick-up support unit 14, a reference image storage unit 15, a critical dimension measurement condition setting support unit 16, a non-inspection area creation support unit 17, a defect inspection condition setting support unit 18 and a decision value setting support unit 19.

Figure 6:
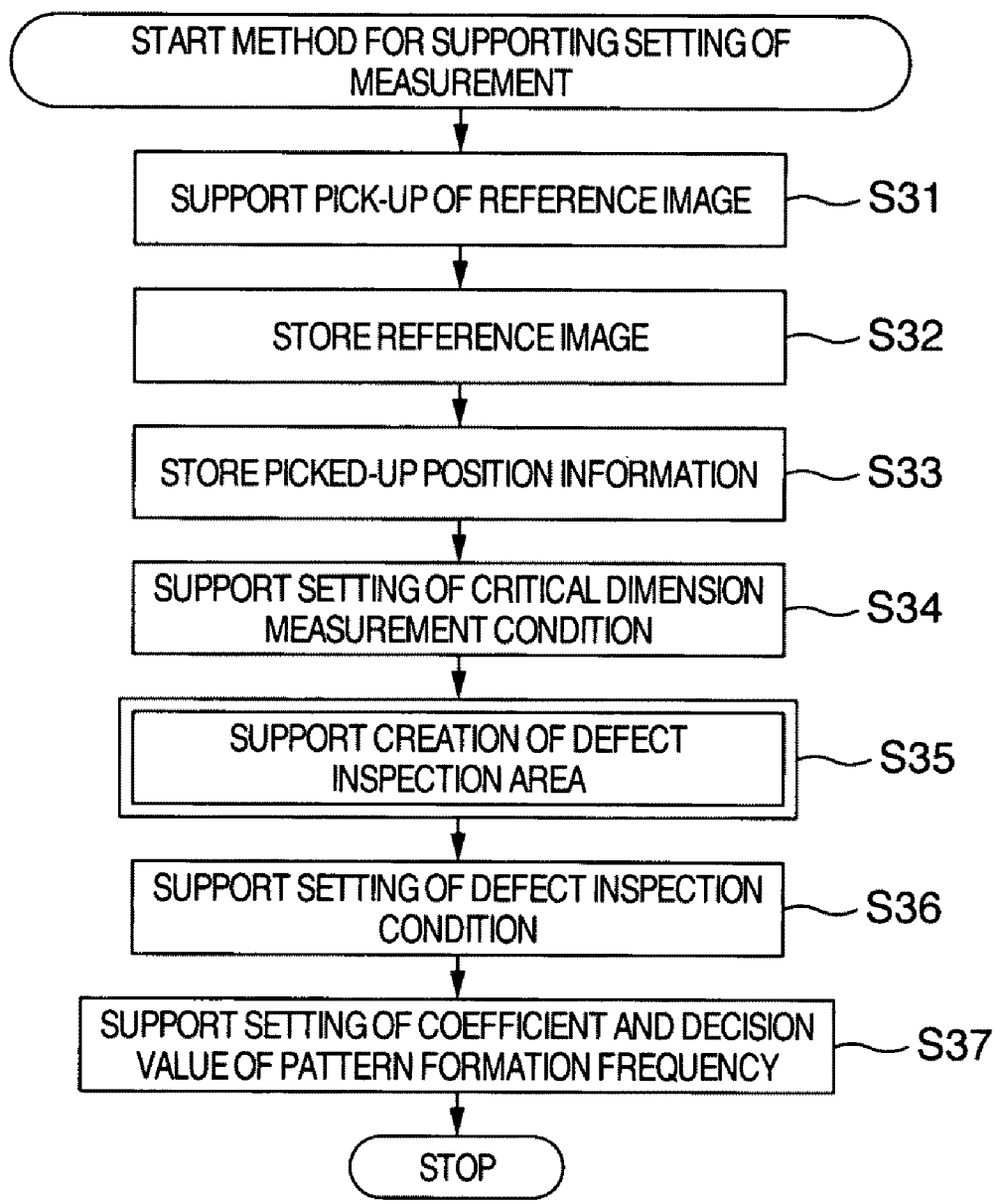
FIG. 6 is a flowchart of a method for supporting setting of measurement.

As shown in FIG. 6, to fulfill the step S13 of measurement setting support in FIG. 3, the reference image pick-up support unit 14 first supports, in step S31, pick-up of a reference image by the user. It is to be understood that the reference image is not limited to an SEM image but it may be a design image or a CG image based on design data of the semiconductor device and in this case, the image pick-up is unnecessary and the design data may be down loaded. The SEM image used as the reference image needs to contain a reference pattern having a normal shape and being devoid of a transcription of a defect.

Next, in step S32, the reference image storage unit 15 stores the reference image. In step S33, the reference image storage unit 15 stores position information of the reference pattern transcribed in the reference image while having it related to the reference image.

In step S34, the critical dimension measurement condition setting support unit 16 supports setting of the critical dimension measurement condition, particularly, in such a way that it gives the user a display of the reference image and urges the user through the GUI to designate a critical dimension measurement condition of a part subject to critical dimension measurement in the reference pattern through the GUI. Then, the designated critical dimension measurement condition is stored while being related to the reference image.

In step S35, the non-inspection area creation support unit 17 supports creation of a defect inspection area and a defect non-inspection area. Specifically, the non-inspection area creation support unit 17 gives the user a display of the reference image and urges the user to create, on the reference image through the GUI, an inspection area to be inspected and a non-inspection area for which inspection is omitted. Alternatively, the non-inspection area creation support unit 17 automatically creates an inspection area and a non-inspection area on the reference image without resort to the user's intervention and stores the created inspection and non-inspection areas while having them related to the reference image. On the reference image, an area not being an inspection area is a non-inspection area and an area not being a non-inspection area is an inspection area and hence, with any one of the inspection and non-inspection areas set, the other is automatically set. Accordingly, the creation of the inspection area has substantially the same meaning as that of the non-inspection area. Likewise, setting of the inspection area has substantially the same meaning as that of the non-inspection area. The step S35 will be detailed later.

In step S36, the defect inspection condition setting support unit 18 supports setting of a defect inspection condition. Specifically, the defect inspection condition setting support unit 18 urges the user to designate a defect inspection condition such as the size of a defect to be inspected through the GUI or by means of a keyboard operation section. Then, the designated defect inspection condition is stored while being related to the reference image.

In step S37, the decision value setting support unit 19 supports setting of coefficient and decision value in a pattern formation frequency. The decision value setting support unit 19 urges the user to designate the coefficient and decision value in the pattern formation frequency through the GUI or by means of the keyboard operation section. Then, the designated coefficient and decision value in the pattern formation frequency are stored while being related to the reference image. This step S37 will be detailed later.

Figure 7:
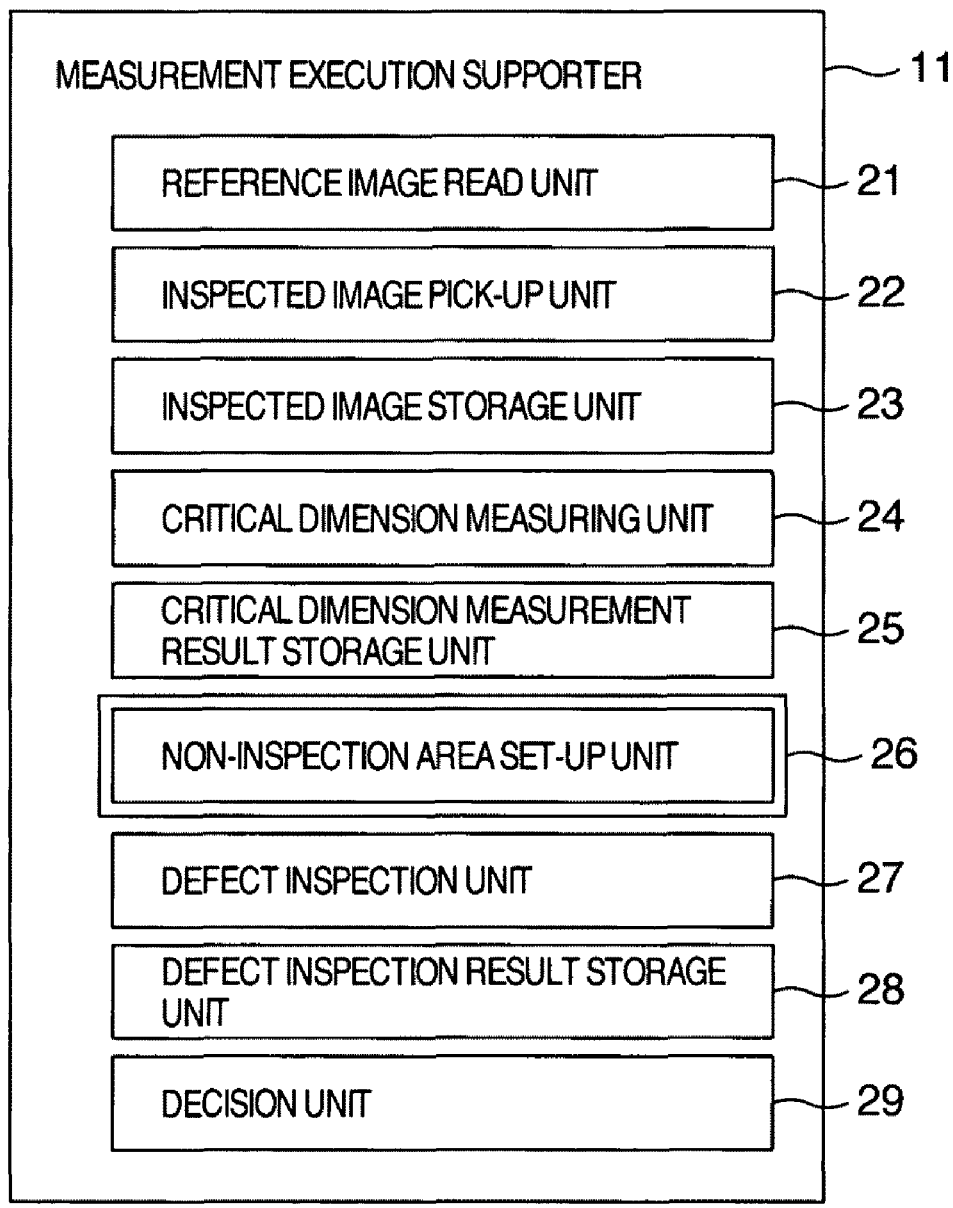
FIG. 7 is a diagram showing the construction of a measurement execution supporter.

Turning to FIG. 7, the measurement execution supporter 11 in FIG. 1 has a reference image read unit 21, an inspected image pick-up unit 22, an inspected image storage unit 23, a critical dimension measuring unit 24, a critical dimension measurement result storage unit 25, a non-inspection area set-up unit 26, a defect inspection unit 27, a defect inspection result storage unit 28 and a decision unit 29.

Figure 8:
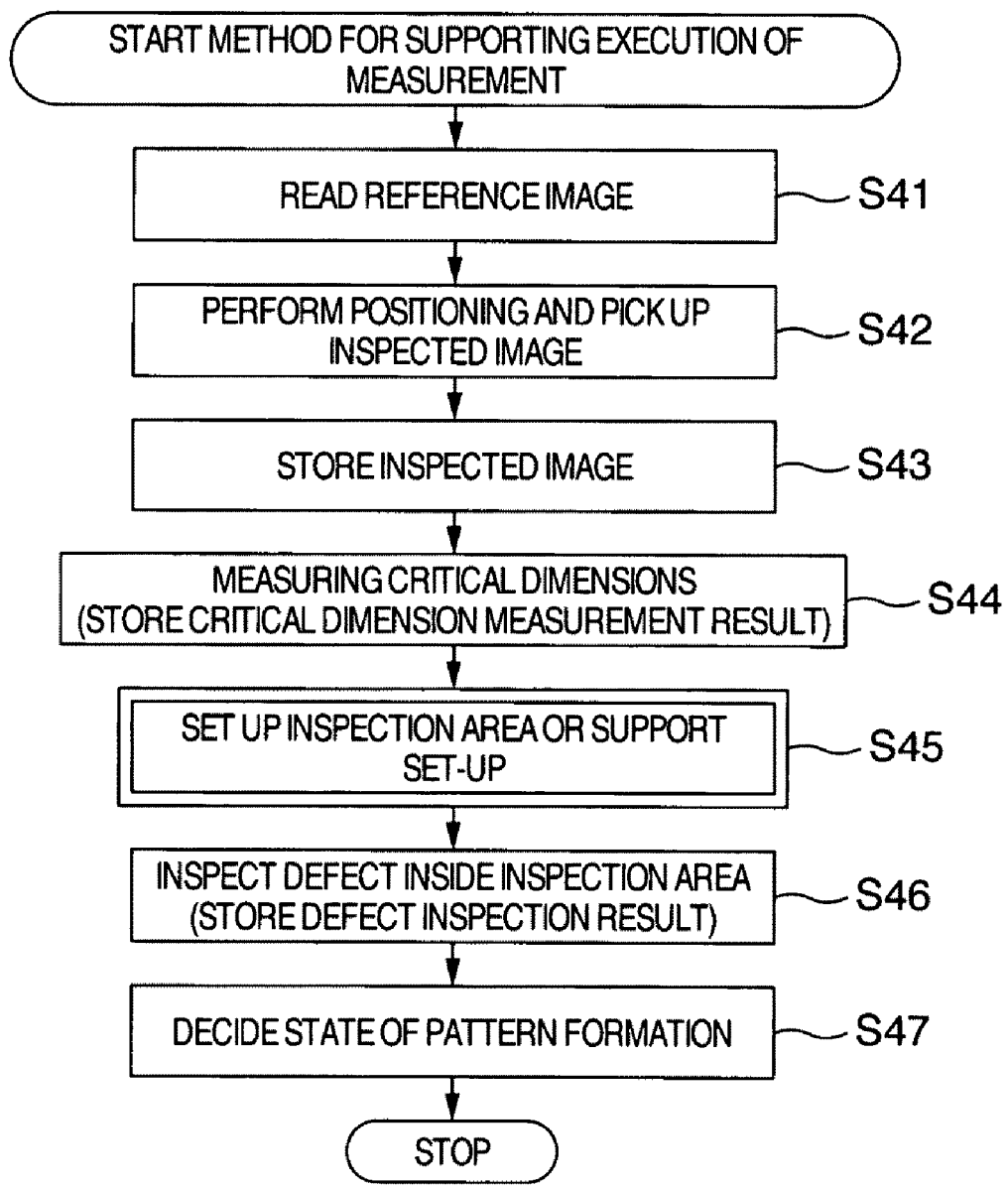
FIG. 8 is a flowchart of a method for supporting execution of measurement.

As shown in FIG. 8, to fulfill the step S23 of measurement execution support in FIG. 4, the reference image read unit 21 first reads, in step S41, the reference image and position coordinates of the reference pattern which have been stored in the reference image storage unit 15.

In step S42, the inspected image pick-up unit 22 gives the user a display of an SEM image pattern-matched (position-matched) to the reference image as an inspected image. Alternatively, it gives the user, as an inspected image, a display of an SEM image containing an inspection pattern which is pattern-matched to the reference pattern transcribed in the reference image. It urges the user to decide the aptitude or inaptitude of the inspected image. When the user applies an input indicative of inaptitude, the pattern matching is carried out reiteratively until a decision of aptitude is obtained. By inputting an aptitude determination, the inspected image is settled and it is picked up.

In step S43, the inspected image storage unit 23 stores the thus picked-up inspected image.

In step S44, the critical dimension measuring unit 24 reads the critical dimension measurement condition stored by means of the critical dimension measurement condition setting support unit 16 and measures critical dimensions of an inspection pattern transcribed in the inspected image along a critical dimension measurement portion prescribed by the critical dimension measurement condition. The critical dimension measurement result storage unit 25 stores the critical dimension measurement result while having it related to the inspected image. The critical dimension measuring unit 24 gives the user a display of the critical dimension measurement result and urges the user to decide settlement or unsettlement of the critical dimension measurement. When the user applies an input of unsettlement, the critical dimension measurement is carried out reiteratively until a settlement determination is obtained. With the settlement determination inputted, the step S44 ends.

In step S45, the non-inspection area set-up unit 26 sets up a non-inspection area and an inspection area as well or supports set-up of them. The step S45 will be detailed later.

In step S46, in connection with the inspected image, the defect inspection unit 27 performs an inspection of a defect inside an inspected area. The defect inspection unit 27 reads the defect inspection condition stored by means of the defect inspection condition setting support unit 18 and on the basis of the defect inspection condition, performs a defect inspection by comparing the reference image with the inspected image to determine the difference as a defect. The defect inspection result storage unit 28 stores the defect inspection result while having it related to the inspected image. For the defect inspection, the presence or absence of a defect and the size of the defect are measured. The defect inspection unit 27 gives the user a display of the defect inspection result and urges the user to decide settlement or unsettlement of the defect inspection. When the user inputs an unsettlement, the defect inspection is carried out reiteratively until a settlement determination is obtained. With a settlement determination inputted, the step S46 ends.

In step S47, the decision unit 29 decides a state of formation of the inspection patterns on the basis of the critical dimension measurement result and the defect inspection result. The decision value setting support unit 19 reads stored coefficients and decision value of a pattern formation frequency and calculates the pattern formation frequency, deciding the magnitude relation between the pattern formation frequency and the decision value. The decision result is stored while being related to the inspected image. This step S47 will be detailed later.

Figure 9:
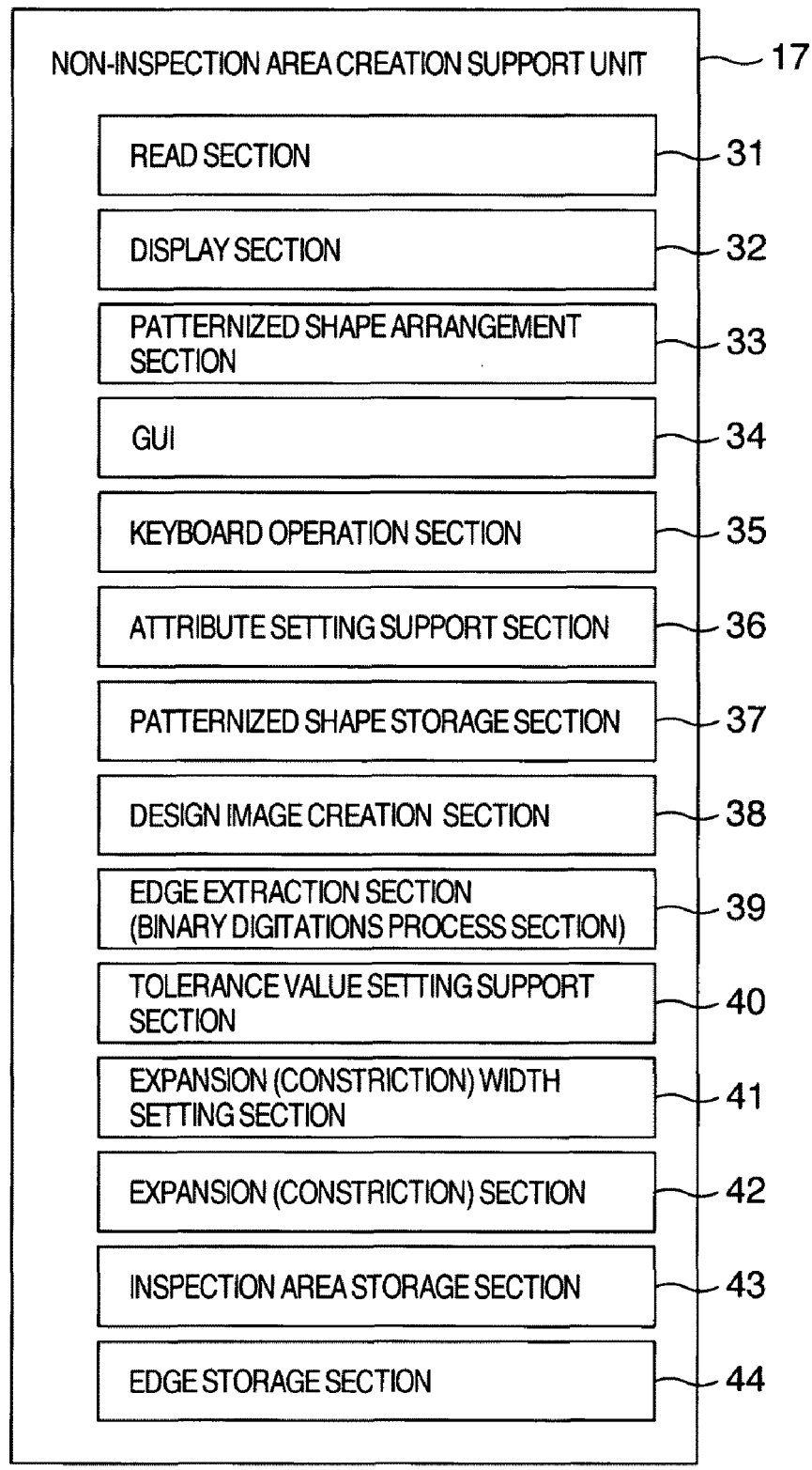
FIG. 9 is a diagram showing the construction of an inspection area creation support unit.

Referring to FIG. 9, the non-inspection area generation support unit 17 has a read section 31, a display section 32, a patternized shape arrangement section 33, a GUI 34, a keyboard operation section 35, an attribute setting support section 36, a patternized shape storage section 37, a design image generation section 38, an edge extraction section (binary digitations process section) 39, a tolerance value setting support section 40, an expansion (constriction) width setting section 41, an expansion (constriction) section 42, an inspection area storage section 43 and an edge storage section 44.

Figure 10:
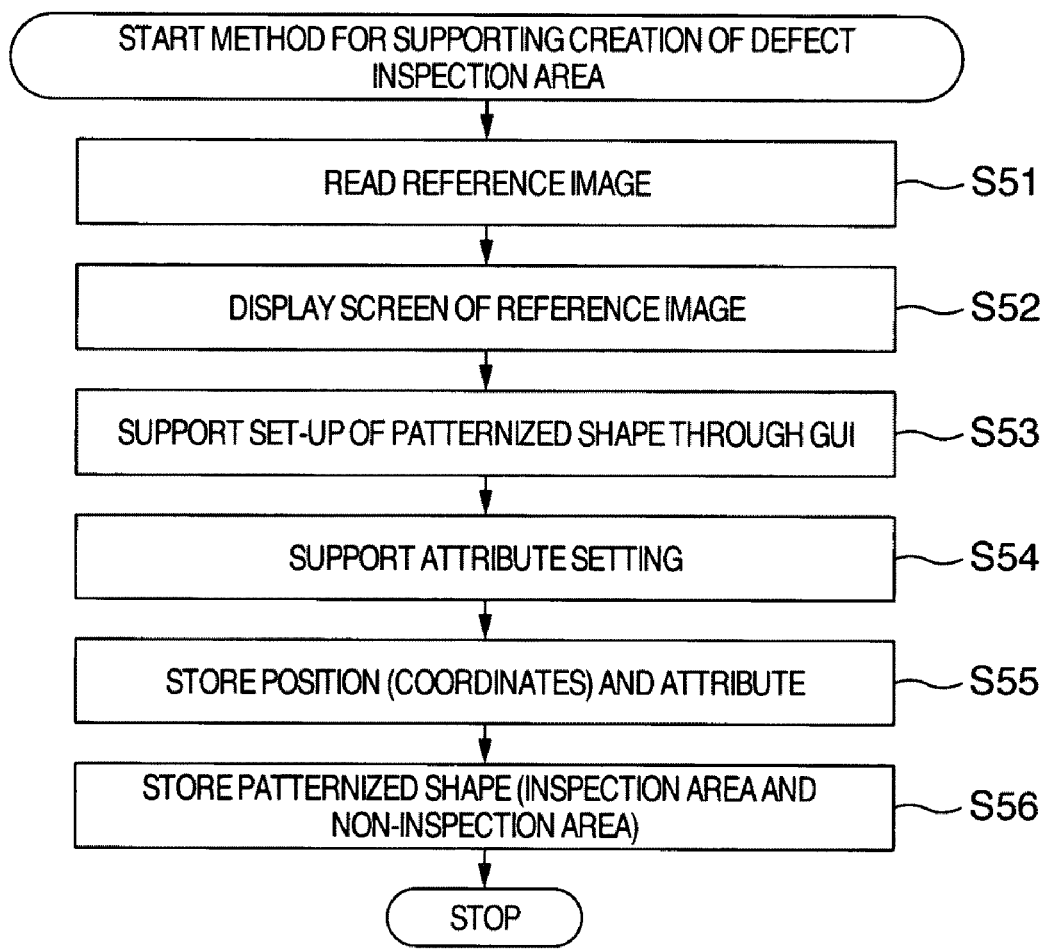
FIG. 10 is a flowchart of a first method for supporting creation of a defect inspection area.

As shown in FIG. 10, to fulfill the step S35 of supporting creation of a defect inspection area in FIG. 6, the read section 31 first reads, in step S51, the reference image which has been stored in the reference image storage unit 15.

Figure 11:
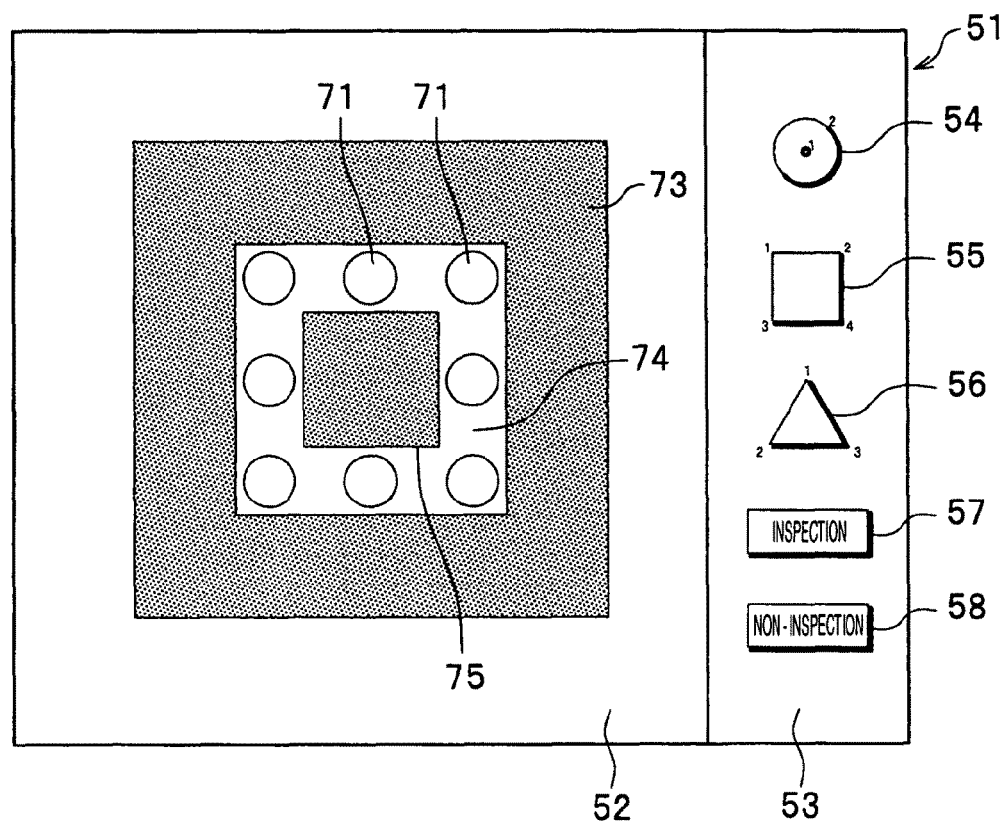
FIG. 11 is a diagram illustrating a display on the screen of a display section.

In step S52, the display section 32 displays a reference image 52 on a display image 51 as shown in FIG. 11. The user can know from the reference image 52 that a plurality of hole patterns 71 are arranged squarely. It is now supposed that the user is thinking of set-up of an inspection area in an area in which the hole patterns 71 are arranged and set-up of a non-inspection area in an area in which no hole pattern 71 is arranged.

In step S53, the patternized shape arrangement section 33 supports the arrangement or disposition of a plurality of patternized shapes in the reference image 52. In the display image 51, a tool bar 53 is displayed including a circular patternized shape designation area 54, a quadrangular patternized shape designation area 55, a triangular patternized shape designation area 56, an attribute designation area 57 for enabling an attribute of an inspection area to be added to the patternized shape, and an attribute designation area 58 for enabling an attribute of a non-inspection area to be added to the patternized shape. When the user designates the circular patternized shape designation area 54 through the GUI and then further designates the center of a circle on the reference image 52 and the contour of the circle as well through the GUI, the patternized shape arrangement section 33 arranges or disposes a circle of a desired size at a desired position on the reference image 52. As regards the quadrangular patternized shape designation area 55, when the user designates the quadrangular patternized shape designation area 55 and four angles of a quadrangle as well on the reference image 52 through the GUI, the patternized shape arrangement section 33 arranges a quadrangle of a desired figure at a desired position on the reference image 52. As regards the triangular patternized shape designation area 56, when the user designates the triangular patternized shape designation area 56 and three angles of a triangle as well on the reference image 52 through the GUI, the patternized shape arrangement section 33 arranges a triangle of a desired figure at a desired position on the reference image 52. The data input by the user is carried out through the GUI but this is not limitative and data such as position coordinates may be inputted in terms of a numerical value by using the keyboard operation section 35.

In step S54, the attribute setting support section 36 supports, through the GUI, setting of an attribute indicative of either an inspection area or a non-inspection area on the patternized shape arranged on the reference image 52. When the user designates the attribute designation area 57 concerning inspection area through the GUI as soon as a patternized shape is arranged on the reference image 52, the patternized shape arrangement section 33 adds the attribute indicative of an inspection area to the patternized shape arranged immediately previously and the patternized shape added with the attribute of inspection area functions as an inspection area. On the other hand, when the user designates the attribute designation area 58 concerning non-inspection area through the GUI, the patternized shape arrangement section 33 adds an attribute indicative of a non-inspection area to the patternized shape arranged immediately previously and the patternized shape added with the attribute of non-inspection area functions as a non-inspection area.

More specifically, as shown in FIG. 11, a quadrangular patternized shape 75 having an attribute of non-inspection area is disposed inwardly of a group of hole patterns 71 on the reference image 52 to function as a non-inspection area. A quadrangular patternized shape 74 having an attribute of inspection area is disposed outwardly of the group of hole patterns 71 on the reference image 52 to function as an inspection area. A quadrangular patternized shape 73 having an attribute of non-inspection area is arranged outwardly of the patternized shape 74 on reference image 52 to function as a non-inspection area. If the patternized shapes 73, 74 and 75 overlap one another, an attribute of the uppermost layer of patternized shape is preferentially applied at an overlapping area only.

In step S55, the patternized shape storage section 37 stores image data or position coordinates and attributes of the patternized shapes in respect of the individual patternized shapes. Further, in step S56, the patternized shape storage section 37 stores the plurality of patternized shapes while having them related to the reference image. Through the procedures as above, the step S35 of supporting creation of defect inspection area in FIG. 6 ends and so the program proceeds to step S36.

Figure 12:
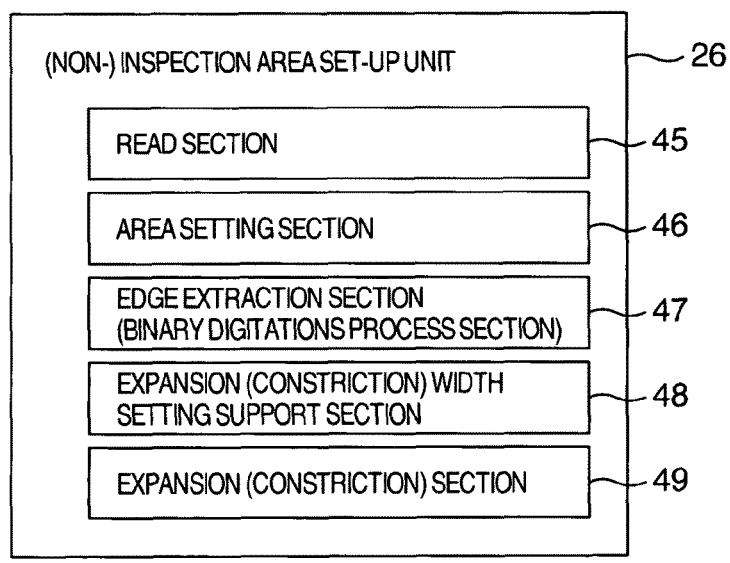
FIG. 12 is a diagram showing the construction of an inspection area set-up unit.

Referring to FIG. 12, the non-inspection area set-up unit 26 in FIG. 7 has a read section 45, an area setting section 46, an edge extraction section (binary digitations process section) 47, an expansion (constriction) width setting support section 48 and an expansion (constriction) section 49.

Figure 13:
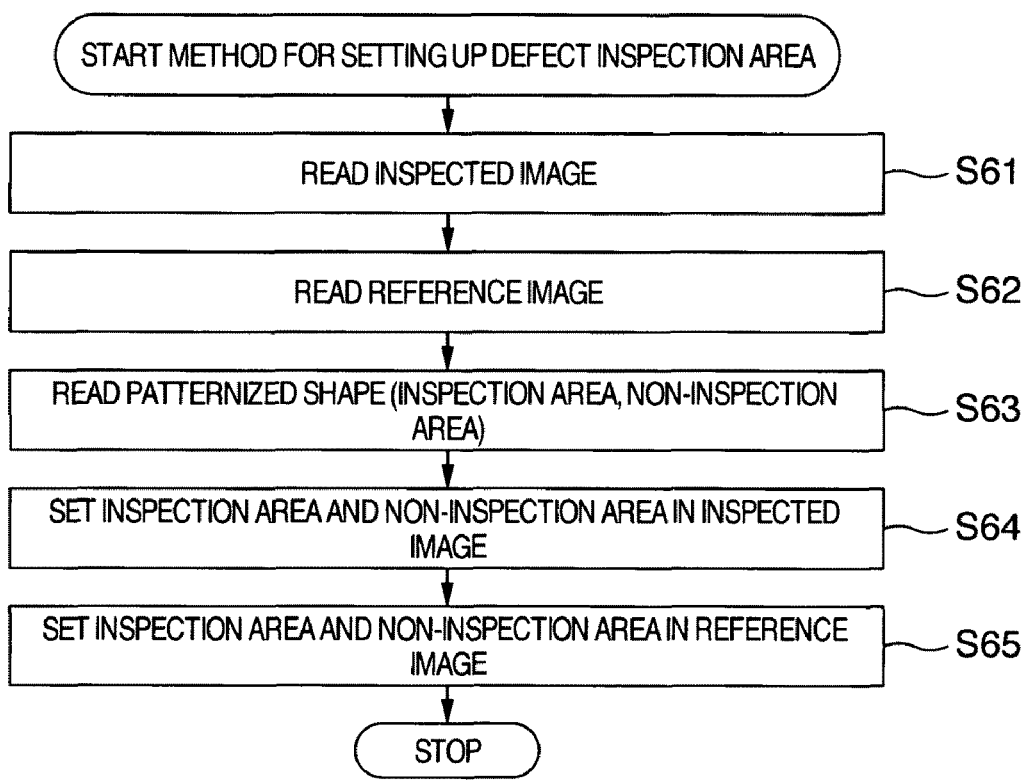
FIG. 13 is a flowchart of a first method for setting up a defect inspection area.

As shown in FIG. 13, to fulfill the measurement execution support in FIG. 8, the read section 45 first reads an inspected image in step S61. In step S62, the read section 45 reads, on the basis of the read-out inspected image, a reference image 52 in FIG. 11, for example. In step S63, on the basis of the read-out reference image 52, the read section 45 reads the patternized shape 74 which functions as an inspection area and the patternized shapes 73 and 75 which function as non-inspection areas. In step S64, the area setting section 46 sets the inspection area and non-inspection areas read out onto the inspected image. In step S65, the area setting section 46 sets the inspection area and non-inspection areas read onto the reference image 52. It is not always necessary that both the steps S64 and S65 are executed but execution of either step is sufficient. Through the above, setting of the inspection area in the step S45 of FIG. 8 ends and so the program proceeds to the step S46. Then, the pattern composite inspection method using the scanning electron microscope 1 can end finally. Thus, the critical dimension measurement and the defect inspection as well can be achieved with the single scanning electron microscope.

For better understanding of the pattern composite inspection method using the scanning electron microscope 1, its points will be described below.

Firstly, the reference image storage unit 15 in FIG. 5 stores a reference image transcribing a reference pattern. Next, on the basis of the stored reference image, the inspected image pick-up unit 22 in FIG. 7 picks up an inspected image transcribing an inspection pattern which pattern-matches to the reference pattern. Then, the critical dimension measuring unit 24 takes critical dimensions of the inspection pattern by using the picked-up inspected image. Finally, the defect inspection unit 27 performs an inspection of a defect inside or outside the inspection pattern by comparing the stored reference image with the picked-up inspected image. To add, the sequence of critical dimension measurement and defect inspection may be reversed. It will be seen from the above that while the reference image and the inspected image are used also in the critical dimension measurement as availed conventionally, the reference image and inspected image as used in the conventional critical dimension measurement are again used for the defect inspection. This enables the single scanning electron microscope to perform alone both the critical dimension measurement and the defect inspection. As regards the defect inspection, the inspection is not directed to the whole of the wafer without exception and the wafer is limited to a range which is transcribed in the measurable inspected image, thus reducing automatically the time necessary for defect inspection.

In the pattern composite inspection method using the scanning electron microscope 1, a non-inspection area set-up apparatus sets up, in either a reference image or an inspected image, a non-inspection area for which the defect inspection unit 27 does not perform a defect inspection. It will be appreciated that the non-inspection area creation support unit 17 in FIG. 5 and the non-inspection area set-up unit 26 in FIG. 7 are merged into the non-inspection area set-up apparatus.

The importance the set-up of a non-inspection area has in the defect inspection based on the scanning electron microscope will be described hereunder.

Conceivably, in the future critical dimension measurement, a line pattern formed to have a line width of 100 nm or less will be arranged in an inspection screen and critical dimensions will be taken. It is expected that the magnification of the inspection screen will be high, amounting up to about 100,000 to 500,000 times. When a defect is detected from the difference between a reference image and an inspected image at such a high magnification, a variation in shape of a pattern due to a variation in semiconductor device production process will be detected between the reference pattern and the inspection pattern in addition to a defect or a foreign matter to be detected originally. The pattern shape variation attributable to the process variation should be tolerated as a margin if it is confined in a range not particularly affecting the performance of the semiconductor device.

The pattern shape variation due to the process variation is under the influence of a variation in the process of production of a pattern to be inspected and develops as an area resulting from extraction of a change of the inspection pattern which is deformed within a normal range in relation to the reference pattern. Accordingly, the pattern shape variation is detected through the defect inspection.

Figure 31A:
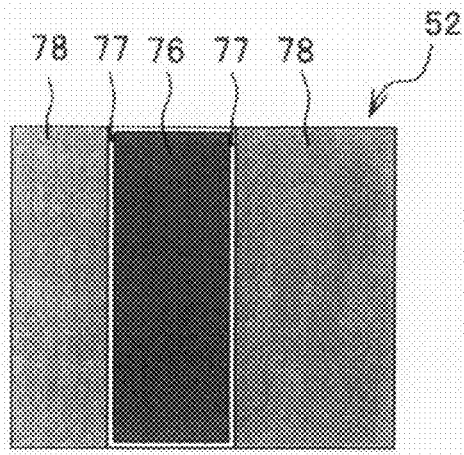
FIG. 31A is a diagram illustrating a reference (or inspected) image (SEM image) of a line pattern having steep sidewalls.
Figure 31C:
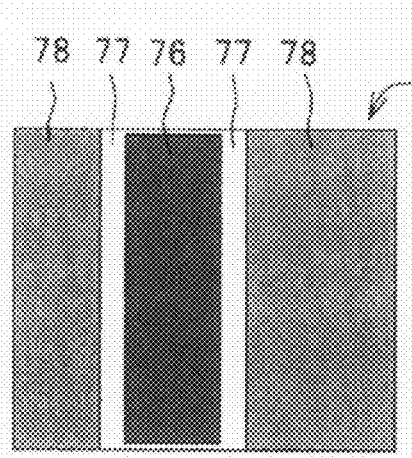
FIG. 31C is a diagram illustrating a reference (or inspected) image (SEM image) of a line pattern having gradual sidewalls.
Figure 31B:
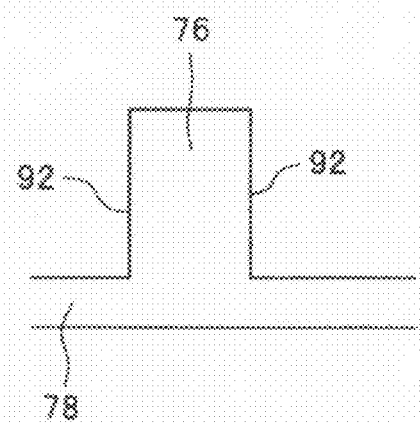
FIG. 31B is a sectional view of the line pattern having steep sidewalls.

More specifically, it is assumed that as shown in FIGS. 31A and 31B a line pattern 76 is formed on a substrate 78 through the production process of semiconductor device. The sidewalls (edge part) 92 of pattern 76 are formed steeply. Since secondary electrons from the side walls 92 are hardly detected, areas corresponding to the side walls 92 are whitened in a reference image 52 representing an SEM image as shown in FIG. 31A, exhibiting a so-called white band 77.

Figure 31D:
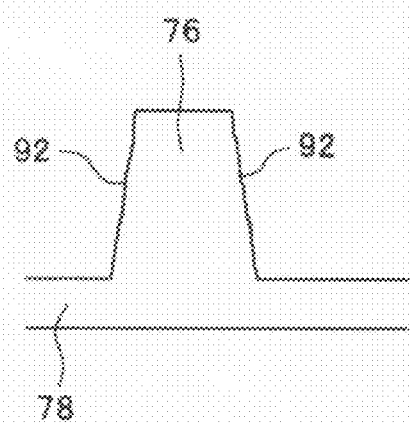
FIG. 31D is a sectional view of the line pattern having gradual sidewalls.

For example, when as shown in FIGS. 31C and 31D there occurs in the pattern 76 a pattern shape variation due to a process variation, the side walls 92 become gradual and the white band 77 is thickened. Even in the presence of such a shape variation in the pattern 76, the performance of the semiconductor device will not sometimes be affected thereby particularly and in this case, the shape variation as above need not be detected as a defect in the defect inspection.

Turning to FIG. 32A, it is supposed that a hole pattern 89 is formed in a substrate 91 in the semiconductor device production process. In the case of hole pattern 89, too, an area corresponding to its side (circumferential) wall is accompanied by a white band 90 in an inspected image 88 representing an SEM image. For example, when the hole pattern 89 varies in shape on account of a process variation as shown in FIG. 32B, the diameter of hole pattern 89 reduces and the white band 90 reduces concomitantly in its inner and outer diameters. Even in the presence of the shape variation of hole pattern 89 as above, the performance of the semiconductor device will not sometimes be affected thereby particularly and in this case, the shape variation as above need not be detected as a defect in the defect inspection.

In some cases, the pattern shape variation due to the process variation develops as being more largely than a defect to be detected originally. In conducting the defect inspection, an inspection is carried out while setting a minimum defect size to be detected. This is because if the defect size falls below a fixed size pursuant to the production rule for line width, for example, it has no influence, in general, upon the performance of the semiconductor device. Infrequently, however, the pattern shape variation will exceed the minimum defect size and will be detected as a defect indiscriminately from the literal or proper defect.

In the following description, the minimum defect size will be studied by relatively changing it in relation to the defect size and the pattern variation.

(1) Firstly, an instance will be studied where the minimum defect size is less than or equal to actual defect size and process variation as well.

Figure 33A:
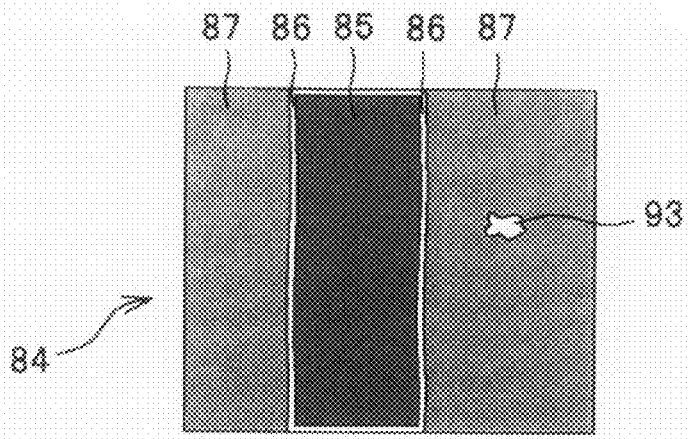
FIG. 33A is a diagram illustrating an inspected image of a line pattern with a narrow white band accompanying a large defect.

Illustrated in FIG. 33A is an inspected image 84 in which a line pattern 85 is formed on a substrate 87. A white band 86 develops peripherally of the line pattern 85. A defect (foreign matter) 93 is present on the substrate 87.

Figure 33B:
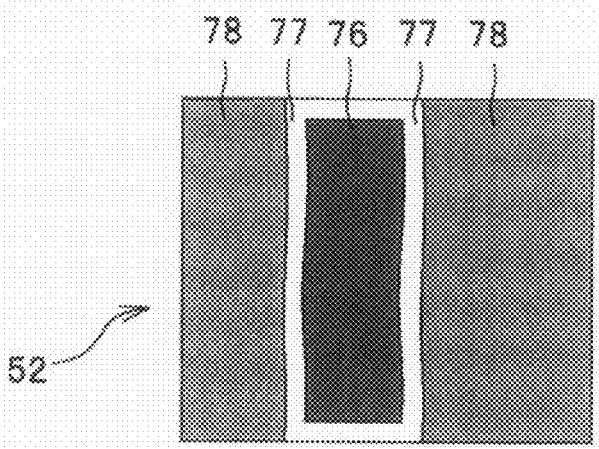
FIG. 33B is a diagram illustrating a reference image of a line pattern with a wide white band.

Illustrated in FIG. 33B is a reference image 52 in which a line pattern 76 is formed on a substrate 78. A white band 77 develops peripherally of the line pattern 76. No defect is present on the substrate 78. As the pattern variation, the white band is narrowed in width from white band 77 to white band 86.

Figure 33C:
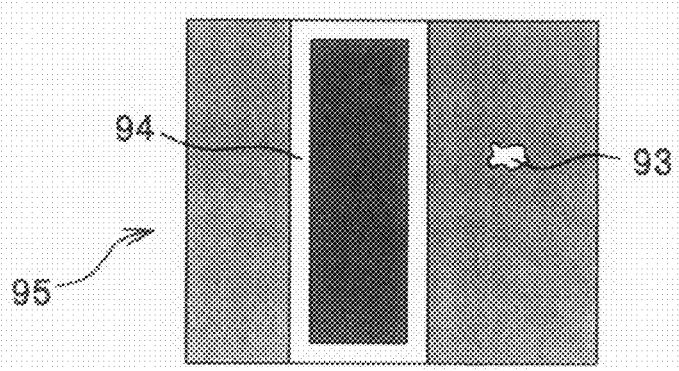
FIG. 33C is a diagram illustrating a difference image as detecting the defect and the white band.

In comparison of the inspected image 84 with the reference image 52, a difference image 95 is obtained as illustrated in FIG. 33C from the difference between inspected image 84 and reference image 52. The actual defect size and the process variation are supposed to be larger than the minimum defect size and therefore, in the difference image 95, the difference larger than the minimum defect size will be displayed and the defect 93 and a white band 94 representing the difference from the pattern variation are both displayed. Namely, in a defect inspection, not only the actual defect 93 but also the white band 94 indicative of the difference is detected. In case information needed as the defect detection result is the presence or absence of defects, the above detection is not erroneous but if the maximum size of defect 93 is treated as the defect inspection result, there results an erroneous detection.

(2) An instance where the minimum defect size is less than or equal to process variation and greater than actual defect size will be studied next.

Figure 34A:
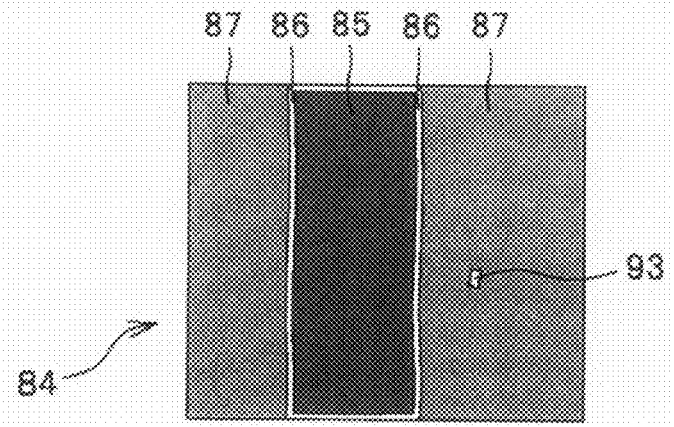
FIG. 34A is a diagram illustrating an inspected image of a line pattern with a narrow white band accompanying a small defect.

In an inspected image 84 as shown in FIG. 34A, a line pattern 85 is formed on a substrate 87. A white band 86 develops peripherally of the line pattern 85. A defect (foreign matter) 93 is present on the substrate 87. The defect 93 is a defect desired to be detected through a defect inspection. But the defect 93 is sized less than the minimum defect size and cannot be detected.

Figure 34B:
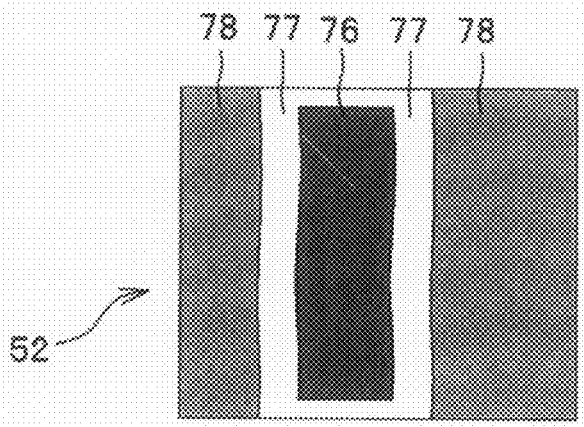
FIG. 34B is a diagram illustrating a reference image of a line pattern with a wide white band.

In a reference image 52 as shown in FIG. 34B, a line pattern 76 is formed on a substrate 78. A white band 77 develops peripherally of the line pattern 76. As a pattern variation, the white band is narrowed in width from white band 77 to white band 86.

Figure 34C:
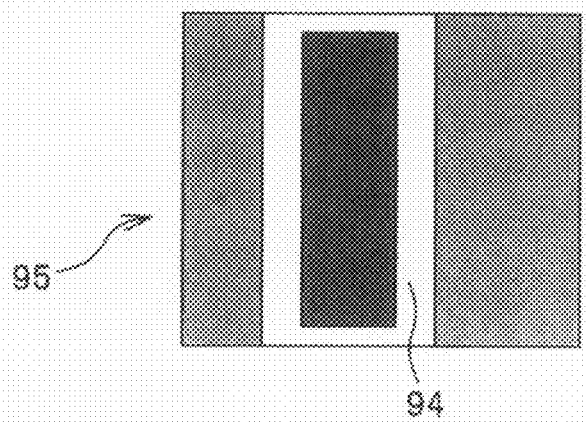
FIG. 34C is a diagram illustrating a difference image as detecting only the white band.

Illustrated in FIG. 34C is a difference image 95 indicative of the difference between inspected image 84 and reference image 52. In the difference image 95, a difference white band 94 is larger than the minimum defect size and is therefore displayed in the difference image 95. Namely, in the defect inspection, the actual defect is not detected and only the difference white band 94 is detected, leading to an erroneous detection.

(3) Now, an instance where the minimum defect size is larger than or equal to process variation and is smaller than actual defect size will be described.

Figure 35A:
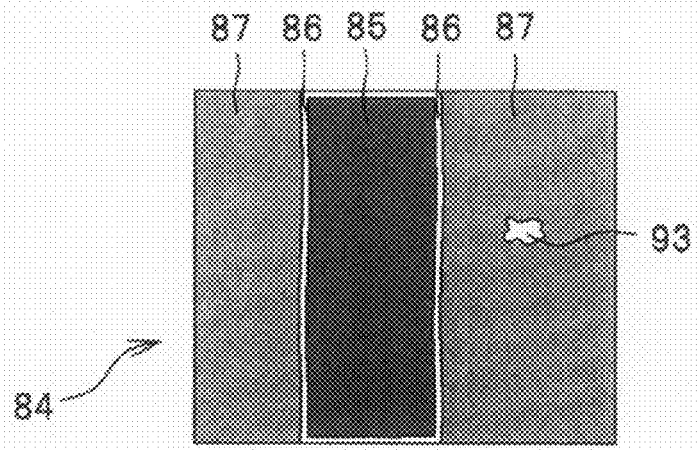
FIG. 35A is a diagram illustrating an inspected image of a line pattern with a narrow white band accompanying a large defect.

Illustrated in FIG. 35A is an inspected image 84 in which a line pattern 85 is formed on a substrate 87. A white band 86 develops peripherally of the line pattern 85. A defect (foreign matter) 93 is present on the substrate 87.

Figure 35B:
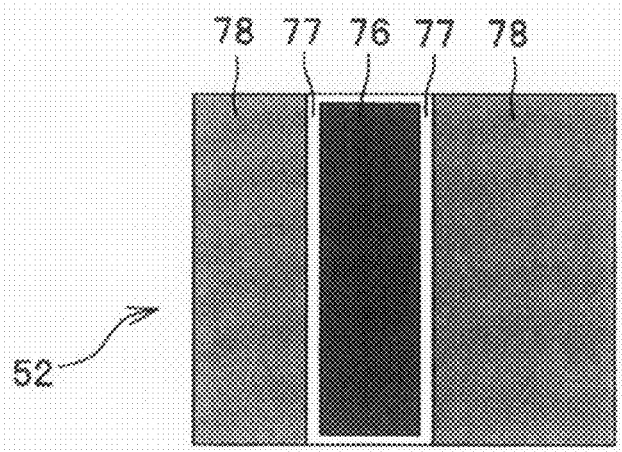
FIG. 35B is a diagram illustrating a reference image of a line pattern with a narrow white band.

In a reference image 52 as shown in FIG. 35B, a line pattern 76 is formed on a substrate 78. A white band 77 develops peripherally of the line pattern 76. Under the influence of a pattern variation, the white band is slightly narrowed in width from white band 77 to white band 86.

Figure 35C:
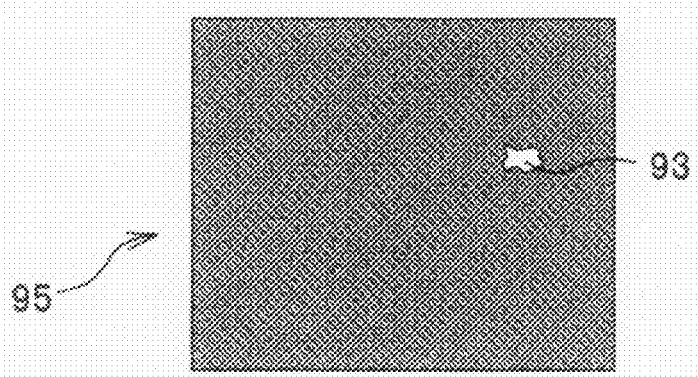
FIG. 35C is a diagram illustrating a difference image as detecting only the defect.

The inspected image 84 is compared with the reference image 52 and the difference between inspected image 84 and reference image 52 is obtained as a difference image 95 as shown in FIG. 35C. In the difference image 95, the difference in width between white band 77 and white band 86 is smaller than the minimum defect size and therefore the difference white band is not displayed on the difference image 95. On the other hand, the defect size of defect 93 exceeds the minimum defect size and the defect 93 is displayed on the difference image 95. In other words, in the defect inspection, the actual defect 93 can be detected but the difference white band cannot be detected. This result of defect inspection is desirable. This result can be obtained with the minimum defect size being larger than the pattern variation and being smaller than the actual defect size. In the future, the technology will have a tendency toward making smaller the minimum defect size necessary for detection of far the smaller defects and presumably, the magnitude relation of the minimum defect size to the pattern variation now being larger than the pattern variation will be difficult to maintain.

From the above, preferably, the difference white band attributable to the pattern variation is not detected. Then, in the pattern composite inspection method using the scanning electron microscope 1, the non-inspection area set-up apparatus sets up a non-inspection area, for which the defect inspection unit 27 does not perform the defect inspection, in a reference image or inspected image. The white band will therefore be considered as being set with a non-inspection area.

Figure 14A:
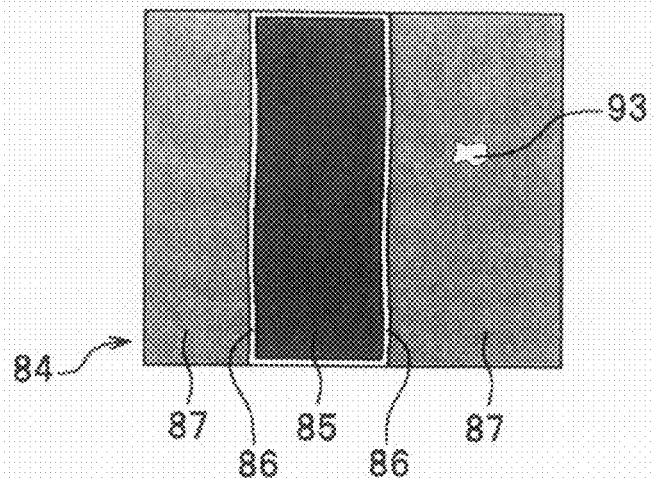
FIG. 14A is a diagram illustrating an inspected image of a line pattern with a narrow white band accompanying a large defect.

Specifically, reverting to FIG. 14A, the inspected image 84 is again supposed to have a substrate 87 on which a line pattern 85 is formed and a white band 86 develops peripherally of the line pattern 85. A defect (foreign matter) 93 is present on the substrate 87. Then, a non-inspection area will be set for the white band 86.

Figure 14B:
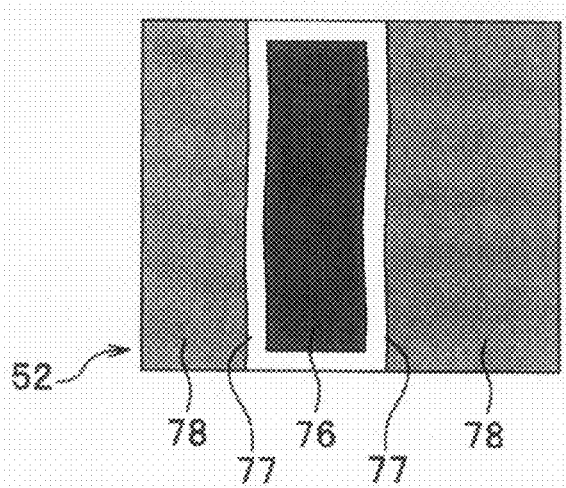
FIG. 14B is a diagram illustrating a reference image of a line pattern with a wide white band.

The reference image 52 in FIG. 14B is again supposed to have a substrate 78 on which a line pattern 76 is formed and a white band 77 develops peripherally of the line pattern 76. A non-inspection area will also be set for the white band 77.

Figure 14C:
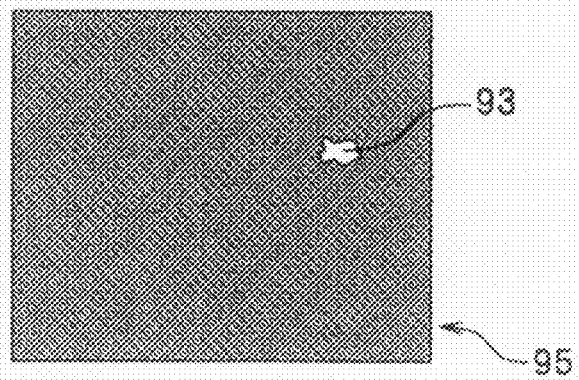
FIG. 14C is a diagram illustrating a difference image as detecting only a defect.

The difference image 95 in FIG. 14C is again indicative of the difference between inspected image 84 and reference image 52. Since areas in which the white bands 86 and 77 are present are non-inspection areas, the difference is not extracted, and a display of these non-inspection areas includes no defects consistently. In other words, in the defect inspection, a white band indicative of the difference between the white bands 77 and 86 is not detected and only the defect 93 can be detected. To add, in case one of the white bands 86 and 77 includes the other, a non-inspection area may be set for the one area only.

Next, how to set a non-inspection area for the white bands 86 and 77 will be described. Setting of a non-inspection area and an inspection area has already been described in connection with FIG. 11. On the display image 51 of the display section, the reference image 52 or inspected image 84 is displayed and by urging the user to arrange, on the displayed reference image 52 or inspected image 84 through the GUI, a patternized shape capable of using an attribute of non-inspection area, so that the user can set the patternized shape having an attribute of non-inspection area, that is, a non-inspection area, on the white bands 86 and 77.

It is however difficult for the user to set the non-inspection area for each of the white bands 86 and 77 without exception. Accordingly, a method of setting a non-inspection area for the white bands 86 and 77 automatically without resort to the user will be described hereunder.

(First Automated Set-Up)

Figure 15:
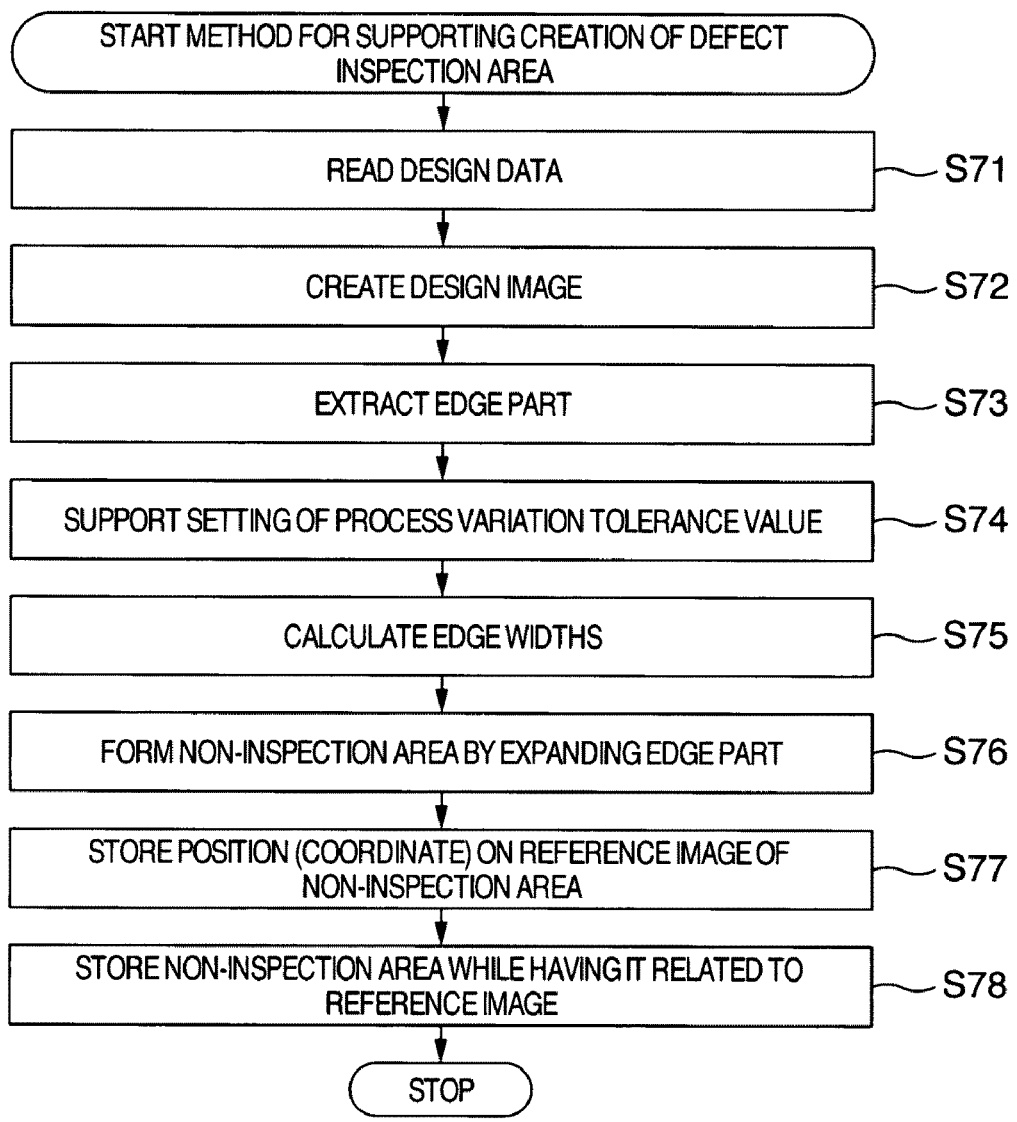
FIG. 15 is a flowchart of a second method for supporting creation of a defect inspection area.

Turning to FIG. 15, there is illustrated a flowchart of a method for supporting creation of a defect (non-) inspection area. This flowchart is executed by means of the non-inspection area creation support unit 17 of FIG. 9. The FIG. 15 flowchart can be executed to fulfill the step S35 of supporting creation of detect inspection area in FIG. 6 instead of the FIG. 10 flowchart or in combination therewith.

As shown in FIG. 15, to fulfill the step S35 of FIG. 6 of supporting creation of a defect inspection area, the read section 31 of FIG. 9 first reads in step S71 design data corresponding to a reference image stored in the reference image storage unit 15.

In step S72, the design image creation section 38 creates a design image related to the reference image on the basis of the read-out design data.

Figure 16A:
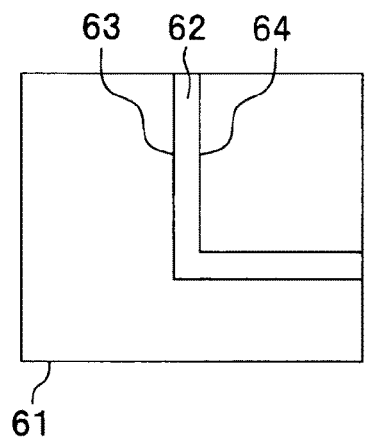
FIG. 16A is a diagram illustrating a design image corresponding to a reference image created from design data.

Turning to FIG. 16A, an example of design image 61 is illustrated. In the design image 61, a line pattern 62 is drawn by drawing opposite edges 63 and 64. Each of the edges 63 and 64 is drawn with a line of fixed thickness. To add, the design image sometimes differs greatly from an SEM image of the reference image. In such a case, a function approximation method such as of sine function, for example, may be applied to the edge part of the design image to correct information of the edge part.

In step S73, the edge extraction section 39 extracts lines representative of the edges 63 and 64.

In step S74, the tolerance value setting support section 40 supports setting of a process variation tolerance value such as a tolerance width of side wall ramp of the line pattern 62. Specifically, the tolerance value setting support section 40 gives the user a display of, for example, a side wall ramp of line pattern 62 to urge the user to input its tolerance value. Through user's input by way of the GUI, the side wall ramp and its tolerance value are set and stored as a process variation tolerance value and the program proceeds to step S75.

In the step S75, on the basis of the process variation tolerance value, the expansion width setting section 41 calculates edge widths for linear and corner portions.

Figure 16B:
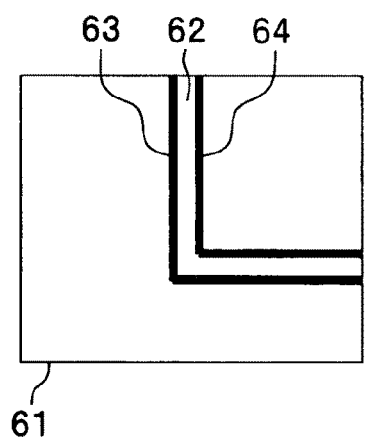
FIG. 16B is a diagram illustrating a design image having an expanded edge part.
Figure 16C:
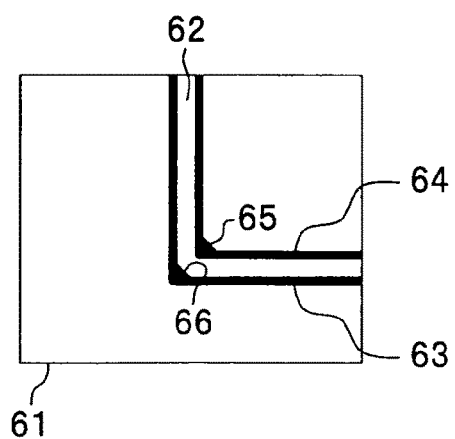
FIG. 16C is a diagram illustrating a design image having corners of the edge part also expanded.

In step S76, the expansion section 42 expands the linear portions of edges 63 and 64 to the edge width for linear portion as shown in FIG. 16B. The expansion section 42 also expands corners 65 and 66 shared in by the edges 63 and 64 into the edge width for corner as shown in FIG. 16C. The expanded edges 63 and 64 provide a non-inspection area. The thus formed non-inspection area is considered as being coincident with the position of the white band.

In step S77, the inspection area storage section 43 stores image data on reference image of the thus formed non-inspection area, for example, position coordinates. Further, in step S78, the inspection area storage section 43 stores the non-inspection area while having it related to the corresponding reference image.

Through the above procedures, a non-inspection area can be created for the white band. Then, by executing the FIG. 13 flowchart, a non-inspection area can be set in an inspected image and a reference image as well. The execution of FIG. 13 flowchart is dealt with by reciting the patternized shape as the non-inspection area instead.

(Second Automated Set-Up)

Figure 17:
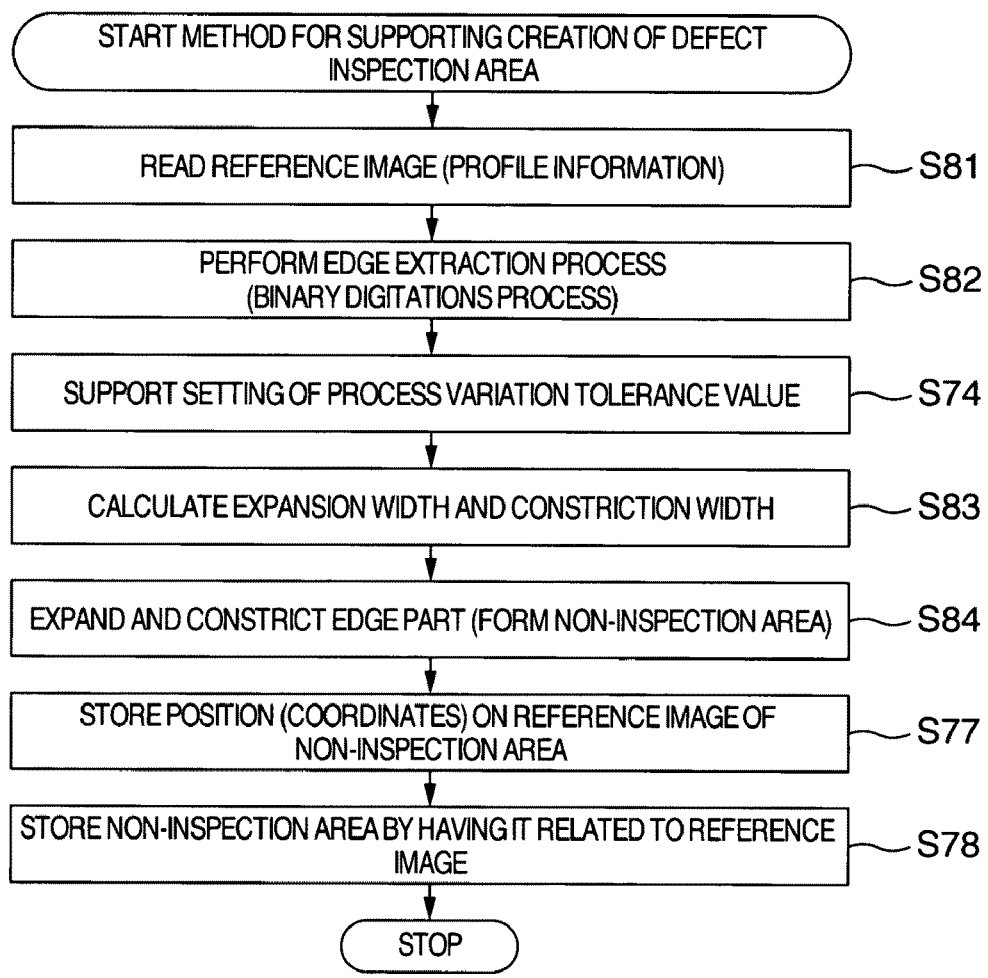
FIG. 17 a flowchart of a third method for supporting creation of a defect inspection area.

A flowchart of a method for supporting creation of a defect (non-) inspection area is also illustrated in FIG. 17. This flowchart is also executed with the FIG. 9 non-inspection area creation support unit 17. The FIG. 17 flowchart can be executed to fulfill the step S35 of supporting creation of defect inspection area in FIG. 6 instead of the FIG. 10 flowchart or in combination therewith.

As shown in FIG. 17, to fulfill the step S35 in FIG. 6 of supporting creation of a defect inspection area, the read section 31 of FIG. 9 first reads, in step S81, a reference image (profile information) stored in the reference image storage unit 15.

An example of reference image 52 is illustrated in FIG. 18A. Displayed in the reference image 52 are a substrate 78, a line pattern 76 formed on the substrate 78 and a white band 77 arranged peripherally of the line pattern 76.

In step S82, the edge extraction section (binary digitations process section) 39 performs a process for extracting the white band 77 corresponding to an edge part. Specifically, a threshold is provided among the brightness at the white band 77 and that at the substrate 78 and pattern 76 and a binary digitations process is executed to extract only the white band as shown in FIG. 18B.

The next step S74 is executed similarly to the step S74 in the FIG. 15 flowchart.

In step S83, on the basis of a process variation tolerance value, the expansion/constriction width setting section 41 calculates an expansion width and a constriction width. The difference of subtraction of the constriction width from the expansion width is so set as to approximate a maximum variation width of the white band.

In step S84, the expansion/constriction section 42 expands once the white-band 77 which corresponds to the edge part and then constricts it. Firstly, the expansion/constriction section 42 expands the white band 77 corresponding to the edge part by the expansion width. Through this expansion, the white band 77 is smoothed. Subsequently, the expansion/constriction section 42 constricts the expanded white band 77 by the constriction width. Since the expansion width is larger than the constriction width, a resulting expanded white band 77 turns to a non-inspection area eventually as shown in FIG. 18C. The constriction is executed to enlarge the expansion width and by virtue of the enlarged expansion width, a smoother white band 77 can be obtained. The thus formed non-inspection area can overlap the white band 77 accurately.

Subsequent steps S77 and S78 can be executed similarly to the steps S77 and S78 in the FIG. 15 flowchart.

As described above, the non-inspection area can be created for the white band. To add, the execution of the FIG. 10 flowchart may continue to the FIG. 17 flowchart. As shown in FIG. 18D, the user may add non-inspection areas 79 and 80 through the GUI.

(Third Automated Set-Up)

While the non-inspection area is created using only the reference image in the second automated set-up, a non-inspection area can be created using both of reference image and inspected image as will be described below.

Also illustrated in FIG. 19 is a flowchart of supporting creation of a defect (non-) inspection area. This flowchart is also executed by means of the FIG. 9 non-inspection area creation support unit 17. The FIG. 19 flowchart can be executed to fulfill the step S35 of supporting creation of a defect inspection area in FIG. 6 instead of the FIG. 10 flowchart or in combination therewith.

To fulfill the step S35 of FIG. 6 of supporting creation of a defect inspection area, steps S81, S82, S74 and S83 in FIG. 19 may first be executed similarly to the steps S81, S82, S74 and S83 in the FIG. 17 flowchart in a manner as shown in FIGS. 18A to 18D.

Subsequently, in step S85, the edge storage section 44 in FIG. 9 stores a position, an expansion width and a constriction width on a reference image while having them related to an edge part in respect of individual reference edges on the reference image. Further, in step S86, the edge storage section 44 stores the reference edge part while having it related to the reference image.

Figure 20:
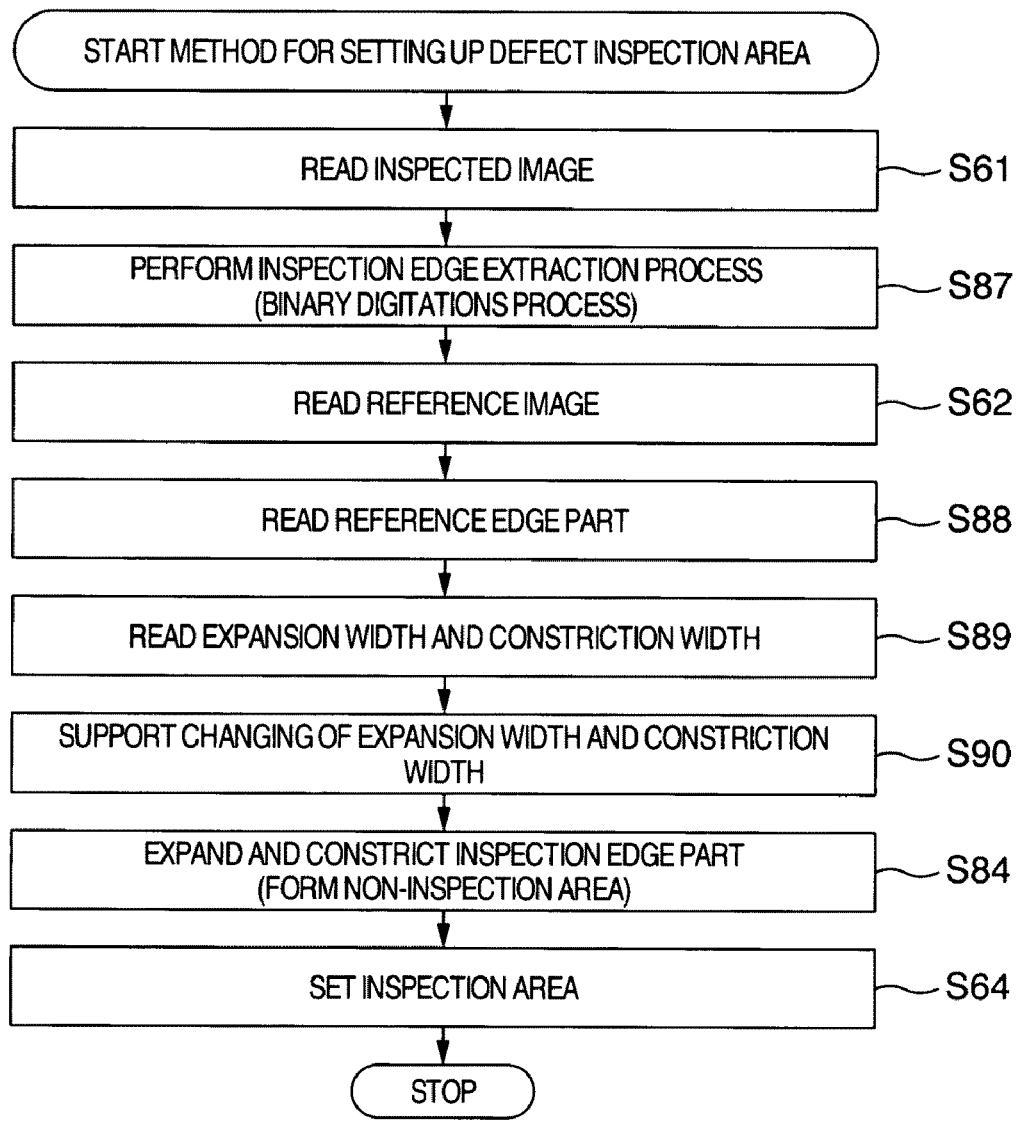
FIG. 20 is a flow chart of a second method for setting up a defect inspection area.

Referring now to FIG. 20, there is illustrated a flowchart of a method of setting up a defect (non-) inspection area. This flowchart is executed with the FIG. 12 non-inspection area set-up unit 26. The FIG. 20 flowchart can be executed to fulfill the step S45 in FIG. 8 of setting up an inspection area or supporting it instead of the FIG. 13 flowchart or in combination therewith.

To fulfill the step S45 in FIG. 8 of supporting creation of a defect inspection area, the read section 45 first reads an inspected image in step S61 as shown in FIG. 20.

In step S87, the edge extraction section (binary digitations process section) 47 extracts and processes an inspection edge part on the inspected image through the binary digitations process similarly to the step S82 of FIG. 19.

In step S62, the read section 45 reads a reference image.

In step S88, on the basis of the read-out reference image, the read section 45 reads a reference edge part.

In step S89, on the basis of the read-out reference edge part, the read section 45 reads an expansion width and a constriction width.

In step S90, the expansion/constriction width setting section 48 supports the user in changing the read-out expansion width and the constriction width. The expansion/constriction with setting support section 48 gives the user a display of the read-out expansion width and constriction width and urges the user to input changed expansion and constriction widths through the GUI.

In step S84, the expansion/constriction section 49 applies the execution of the expansion and constriction to the inspection edge part on the inspected image similarly to the step S84 in FIG. 17. Through the procedures as above, a non-inspection area commensurate with the inspected image is created and the non-inspection area is set up on the inspected image.

In step S64, on the basis of the non-inspection area, the area setting section 46 may also set an inspection area on the residual area as necessary.

17

(Fourth Automated Set-Up)

In the fourth automated set-up, a non-inspection area is created using only an inspected image.

Figure 21:
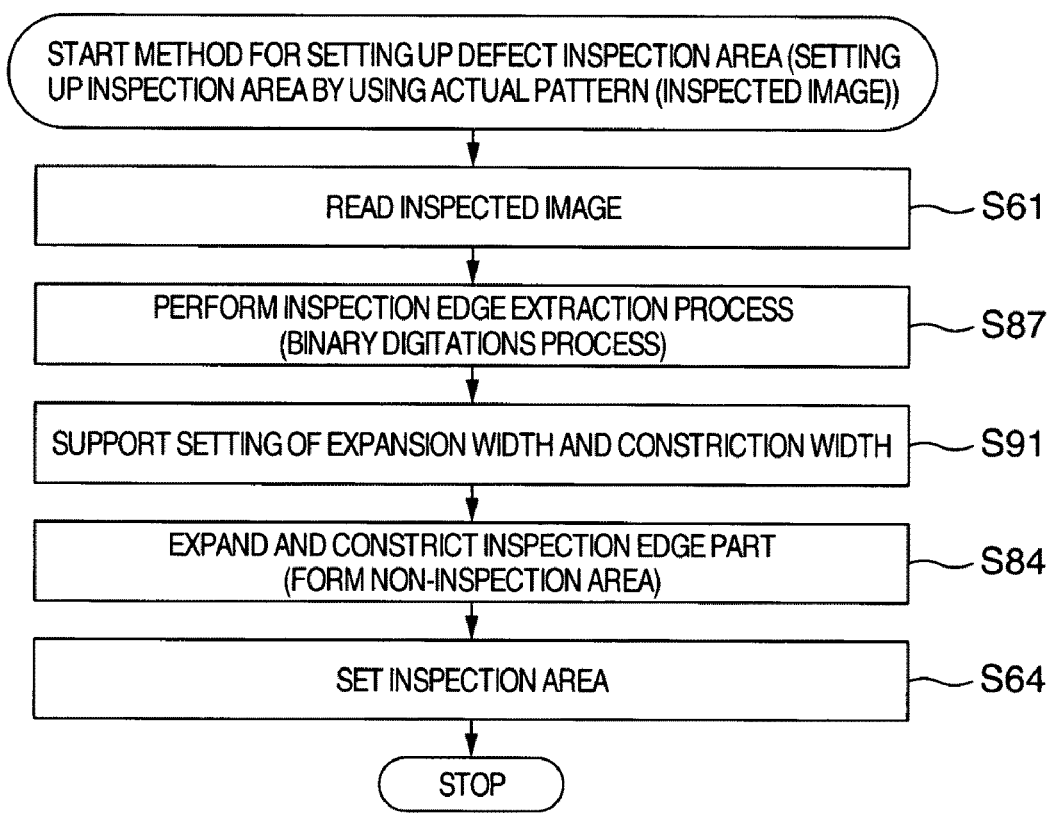
FIG. 21 is a flowchart of a third method for setting up a defect inspection area.

Illustrated in FIG. 21 is a flowchart of a method of setting up a defect (non-) inspection area. The FIG. 21 flowchart is also executed by the non-inspection area set-up unit 26 in FIG. 12. The FIG. 21 flowchart can be executed to fulfill the step S45 in FIG. 8 of setting up an inspection area or supporting it instead of the FIG. 13 flowchart or in combination therewith.

As shown in FIG. 21, to fulfill the step S45 in FIG. 8 of setting up an inspection area or supporting it, the read section 45 first reads an inspected image in step S61.

In step S87, the edge extraction section (binary digitations process section) 47 extracts and processes an inspection edge part on the inspected image similarly to the step S82 in FIG. 19 through the binary digitations process.

In step S91, the expansion/constriction width setting support section 48 executes itself as in the steps S74 and S83 in FIG. 17 to set an expansion width and a constriction width. Subsequently, steps S84 and S64 can be practiced similarly to the steps S84 and S64 in FIG. 20.

(Fifth Automated Set-Up)

While in the fourth and preceding automated set-up methods the edge part (white band) is extracted using design data, reference image and inspected image, the edge part will be extracted using the result of critical dimension measurement of a reference image in the fifth automated set-up.

Figure 22:
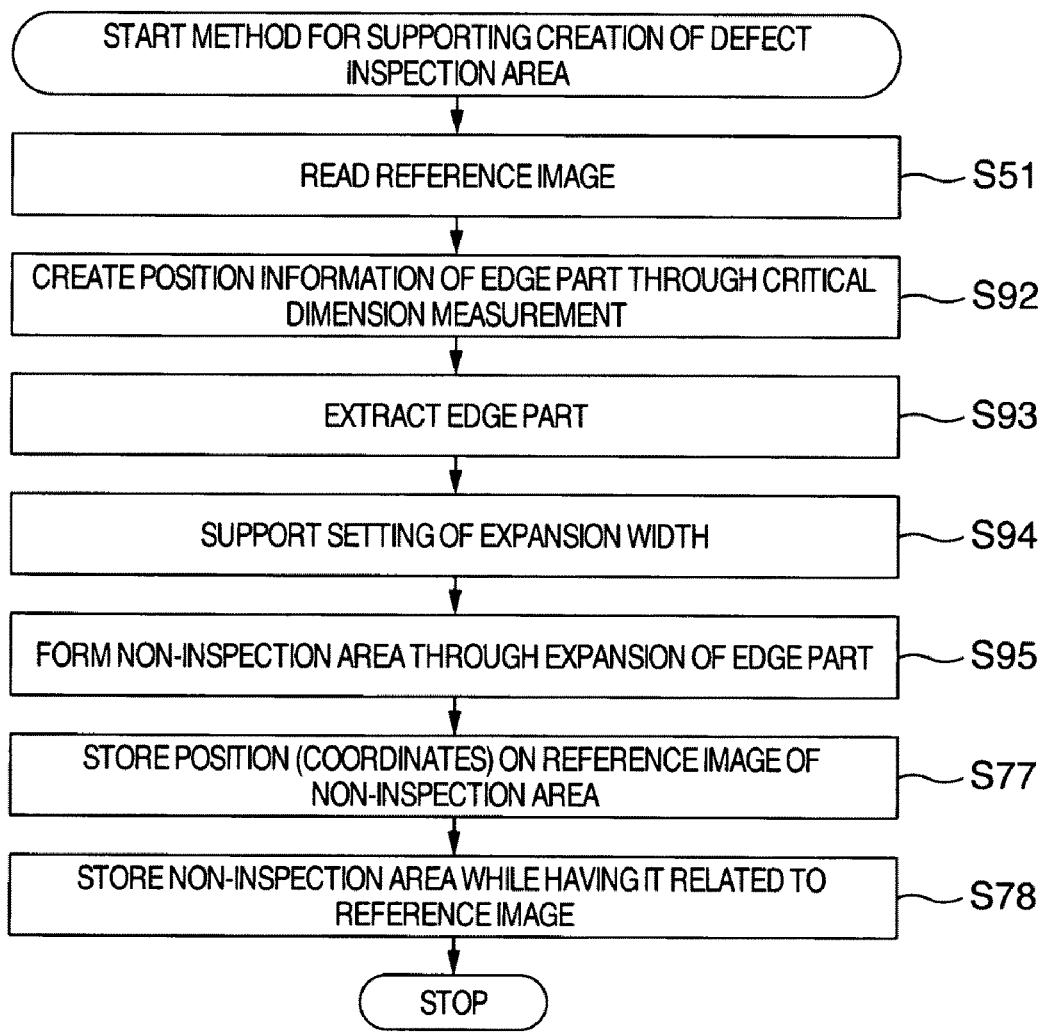
FIG. 22 is a flowchart of a fifth method for supporting creation of a defect inspection area.

Illustrated in FIG. 22 is a flowchart of a method of supporting creation of a defect (non-) inspection area. This flowchart is also executed with the FIG. 9 non-inspection area creation support unit 17. The FIG. 22 flowchart can be executed to fulfill the step S35 in FIG. 6 of supporting creation of defect inspection area or supporting it instead of the FIG. 10 flowchart or in combination therewith.

As shown in FIG. 22, to fulfill support of creation of defect inspection area in the step S35 of FIG. 6, the read section 31 of FIG. 9 first reads in step S51 a reference image stored in the reference image storage unit 15.

Figure 23A:
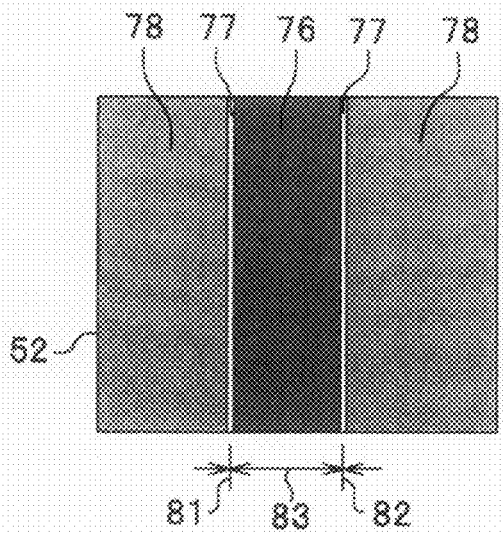
FIG. 23A is a diagram illustrating a reference image.

An example of reference image 52 is illustrated in FIG. 23A. On the reference image 52, a substrate 78, a line pattern 76 formed on the substrate 78 and a white band 77 arranged peripherally of the line pattern 76 are displayed.

In step S92, the critical dimension measuring unit 24 of FIG. 7 takes critical dimensions of the line pattern 76 on the reference image 52. In the normal critical dimension measurement, pieces of information 81 and 82 indicative of positions of opposite edges are determined and a width 83 of the line pattern 76 is determined from the difference between the position information pieces 81 and 82. Accordingly, in the course of critical dimension measurement, the edge position information pieces 81 and 82 are created.

In step S93, the edge extraction section 39 of FIG. 9 extracts the edge position information pieces 81 and 82 from the result of critical dimension measurement of the reference image 52.

In step S94, the expansion width setting section 41 supports setting of expansion width similarly to the steps S74 and S75 of FIG. 15. It is to be noted that the edge width is applied after being replaced with an expanded width.

Figure 23B:
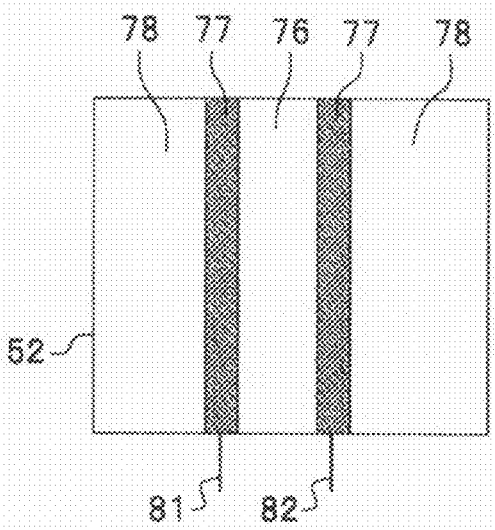
FIG. 23B is a diagram illustrating a reference image subjected to an edge expansion process.

In step S95, the expansion section 42 expands the edge part. More specifically, as shown in FIG. 23B, areas having each an expanded width and being centered on the edge position information pieces 81 and 82 are set on the opposite sides of the white band 77. The so-called expanded white band 77 acts as a non-inspection area. Succeeding steps S77 and S78 can be practiced similarly to the steps S77 and S78 in FIG. 15.

(Sixth Automated Set-Up)

While, in the fifth automated set-up, the reference edge part of a reference image is expanded by an expanded width based on the result of critical dimension measurement of the reference image, the inspection edge part of an inspected image will be expanded in the sixth automated set-up by the expanded width based on the result of critical dimension measurement of the reference image.

Figure 24:
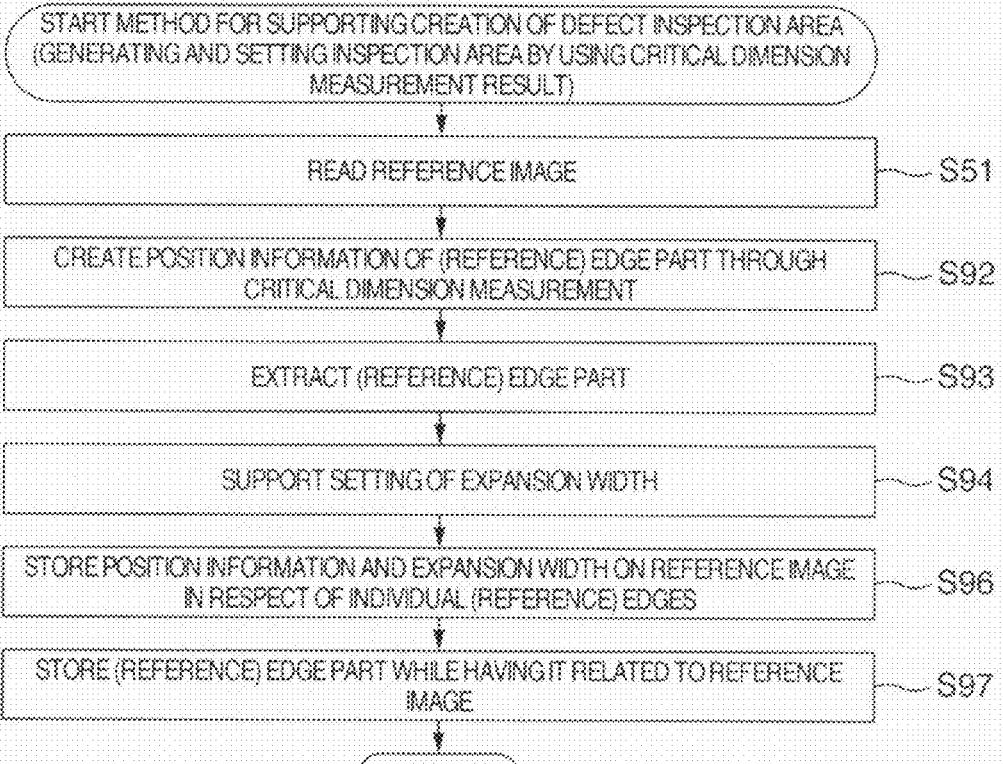
FIG. 24 is a flowchart of a sixth method for supporting creation of a defect inspection area.

Illustrated in FIG. 24 is a flowchart of a method of supporting creation of a defect (non-) inspection area. The flowchart is also executed with the FIG. 9 non-inspection area creation support unit 17. The FIG. 24 flowchart can be executed to fulfill the step S35 in FIG. 6 of supporting creation of defect inspection area instead of the FIG. 10 flowchart or in combination therewith.

As shown in FIG. 24, to fulfill support of creation of defect inspection area in the step S35 in FIG. 6, steps S51, S92, S93 and S94 can first be executed similarly to the steps S51, S92, S93 and S94 in the FIG. 22 flowchart.

Subsequently, in step S96, the edge storage section 44 of FIG. 9 stores positions on a reference image and expansion widths by having them related to an edge part in respect of individual reference edges of the reference image. Further, in step S97, the edge storage section 44 stores the reference edge part by having it related to the reference image.

Figure 25:
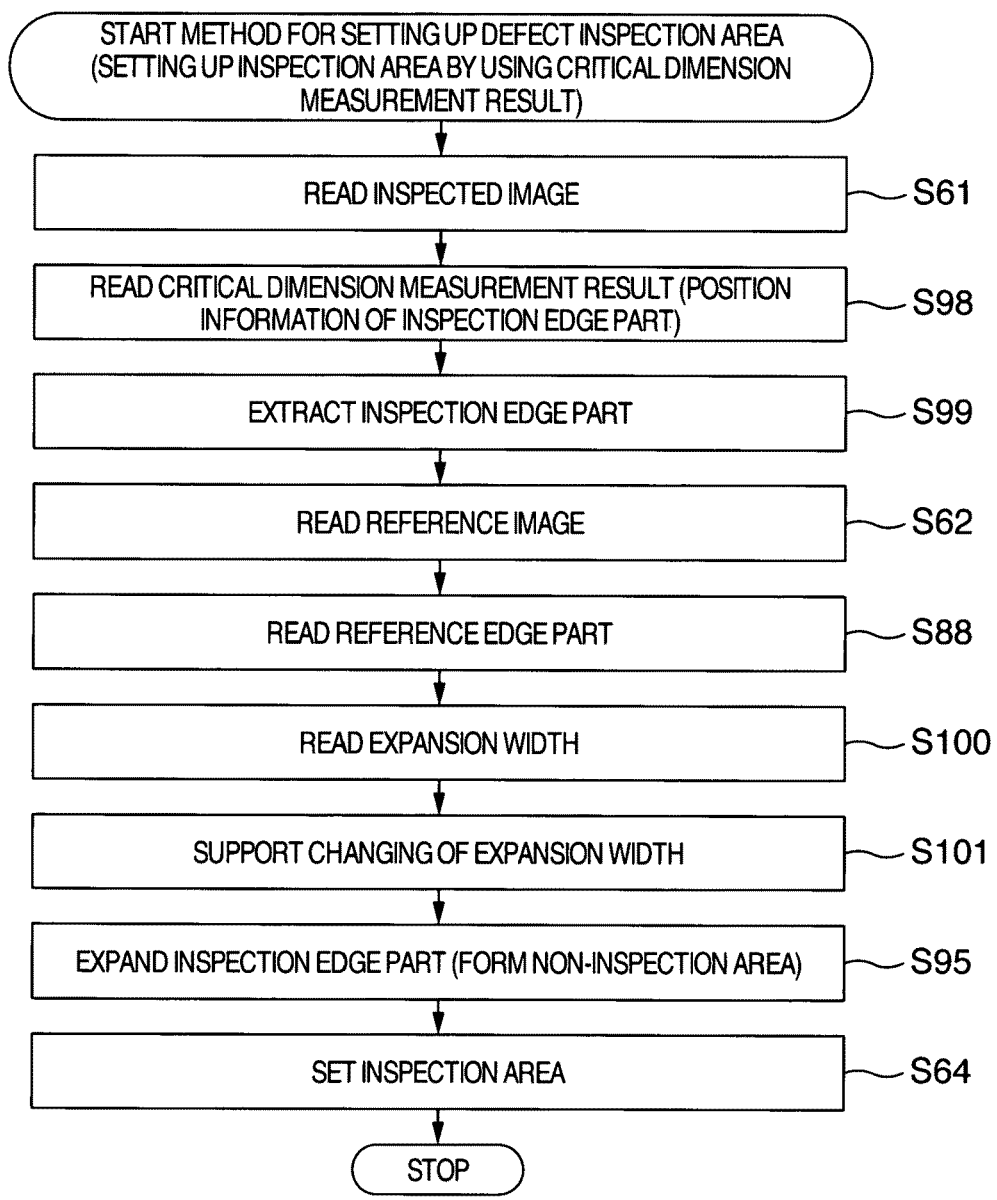
FIG. 25 is a flowchart of a fourth method for setting up a defect inspection area.

Illustrated in FIG. 25 is a flowchart of a method of setting up a defect (non-) inspection area. The flowchart is also executed with the FIG. 12 non-inspection area set-up section 26. The FIG. 25 flowchart can be executed to fulfill the step S45 in FIG. 8 of setting up an inspection area or supporting it instead of the FIG. 13 flowchart or in combination therewith.

As shown in FIG. 25, to fulfill support of creation of defect inspection area in the step S45 of FIG. 8, the read section 45 first reads an inspected image in step S61.

In step S98, on the basis of the read-out inspected image, the read section 45 reads the result of critical dimension measurement (position information of inspection edge part).

In step S99, the edge extraction section 47 extracts the position information of the inspection edge part from the critical dimension measurement result, so that a so-called inspection edge part can be extracted.

In step S62, the read section 45 reads a reference image corresponding to the inspected image. In step S88, the read section 45 reads a reference edge part related to the reference image. In step S100, the read section 45 reads an expansion width related to the reference edge part. In step S101, the expansion width setting support section 48 may support change of the expansion width as in the step S90 of FIG. 20.

In step S95, the expansion section 49 expands the inspection edge part (white band) as in the step S95 of FIG. 22. The thus expanded white band acts as a non-inspection area.

In step S64, the area setting section 46 sets the residual of the set non-inspection area as an inspection area.

(Seventh Automated Set-Up)

In the seventh automated set-up, an inspection edge part is extracted using the result of critical dimension measurement of an inspected image.

Figure 26:
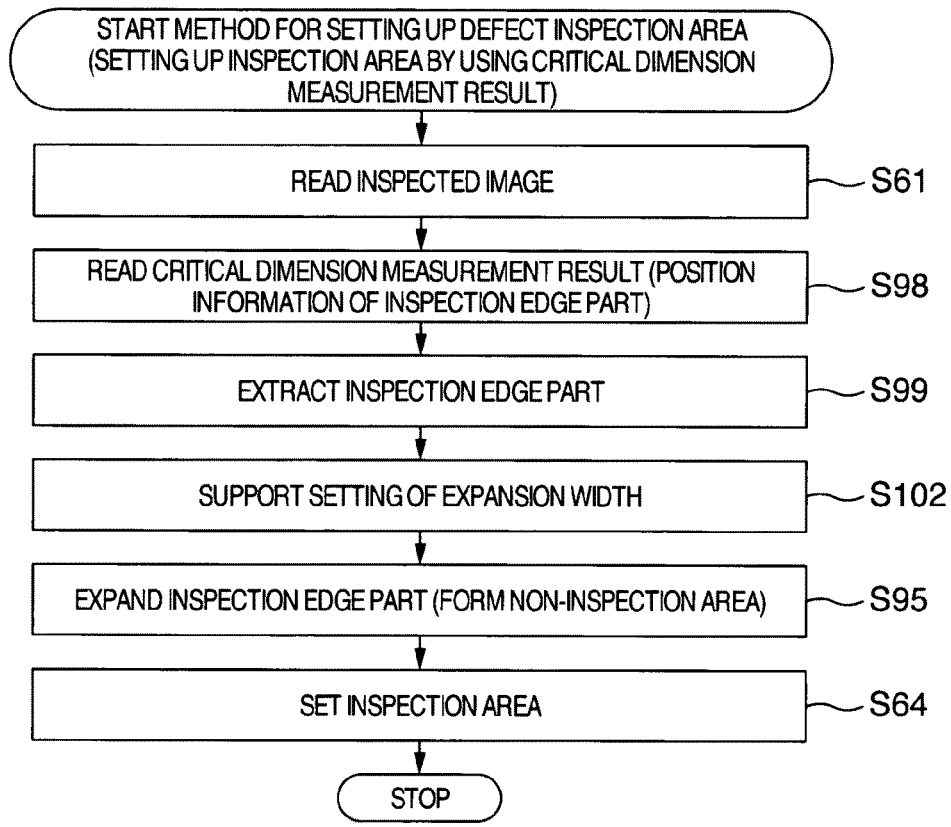
FIG. 26 is a flowchart of a fifth method for setting up a defect inspection area.

Illustrated in FIG. 26 is a flowchart of a method of setting up a defect (non-) inspection area. The flowchart is also executed with the FIG. 12 non-inspection area set-up unit 26. The FIG. 26 flowchart can be executed to fulfill the step S45 in FIG. 8 of setting up an inspection area or supporting it instead of the FIG. 13 flowchart or in combination therewith.

As shown in FIG. 26, to fulfill the inspection area set-up or support thereof in the step S45 of FIG. 8, the read section 45 first reads an inspected image in step S61.

In step S98, the read section 45 reads the result of critical dimension measurement (position information of inspection edge part). In step S99, the edge extraction section 47 extracts the position information of the inspection edge part. In step S102, the expansion width setting support section 48 supports setting of the expansion width. In step S95, the expansion section 49 expands the inspection edge part by an expanded width. Through this, a non-inspection area can be formed. In step S64, the area setting section 46 sets the residual of the non-inspection area as an inspection area.

(Pattern Formation Frequency)

Figure 29A:
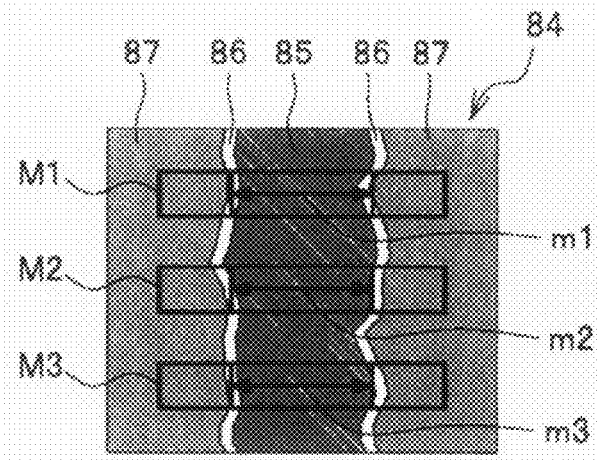
FIG. 29A is a diagram illustrating an inspected image of a line pattern during critical dimension measurement.
Figure 29B:
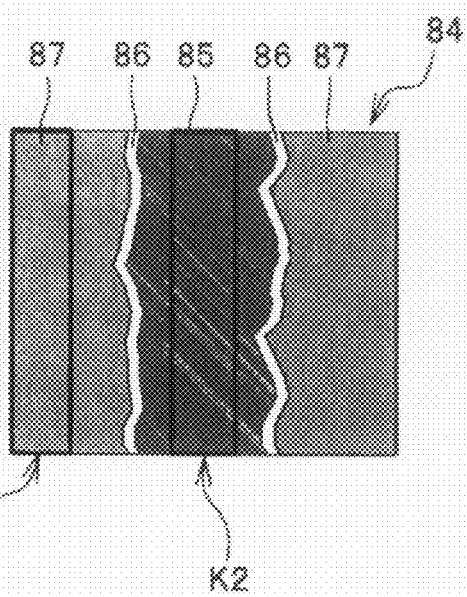
FIG. 29B is a diagram illustrating an inspected image of a line pattern during defect inspection.
Figure 30A:
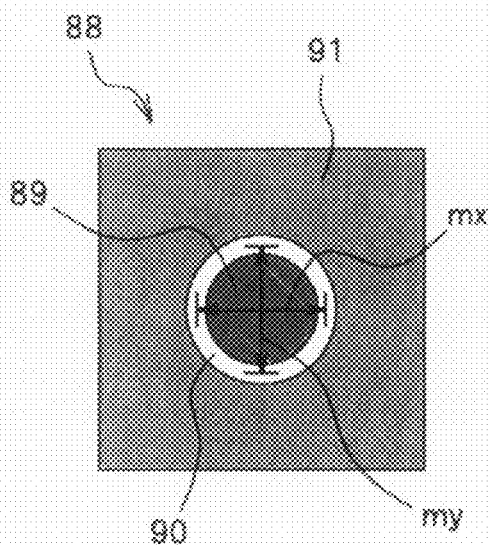
FIG. 30A is a diagram illustrating an inspected image of a hole pattern during critical dimension measurement.
Figure 30B:
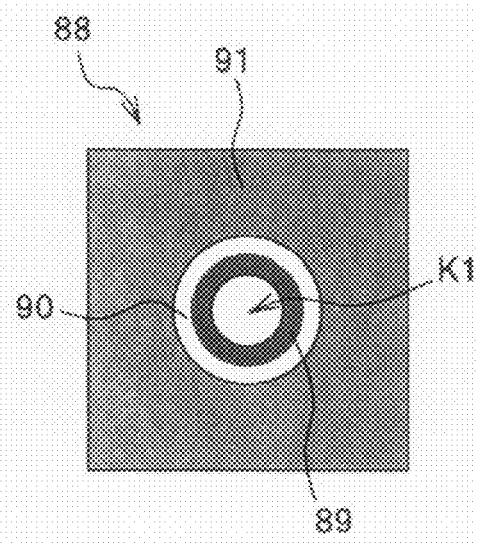
FIG. 30B is a diagram illustrating an inspected image of a hole pattern during defect inspection.

Next, the pattern formation frequency explained in connection with the step S37 of FIG. 6 and step S47 of FIG. 8 will be described. The pattern formation frequency is indicated by equation (1) for a line pattern and by equation (2) for a hole pattern. According to the pattern formation frequency, a state of formation of patterns can be decided in respect of each inspected image from the result of critical dimension measurement and the result of defect inspection.

$$\text{pattern formation frequency (for line pattern)} = \alpha 1*m1/D1 + \alpha 2*m2/D2 + \alpha 3*m3/D3 + \beta 1*k1 + \beta 2*k2 \quad (1)$$

where m1, m2 and m3 represent results of critical dimension measurement in measurement areas M1, M2 and M3, respectively, shown in FIG. 29A. Represented by D1 to D3 are line widths of design data in the measurement areas M1 to M3, respectively. Represented by k1 is a result of defect inspection in a defect inspection area K1 in FIG. 29B, being 1 for the presence of a defect and 0 for the absence of a defect, for example. Represented by k2 is a result of defect inspection in a defect inspection area K2, being 1 for the presence of a defect and 0 for the absence of a defect, for example. Represented by α1 to α3 are contribution factors of the result of critical dimension measurement to the state of pattern formation. Represented by β1 and β are contribution factors of defect/foreign matter to the state of pattern formation.

$$\text{pattern formation frequency (for hole pattern)} = \alpha 1*mx/DH + \alpha 2*my/DH + \beta 1*k1*(ks1/(DH*DH*\pi)) \quad (2)$$

where mx represents the result of critical dimension measurement in x axis direction of a hole pattern 89 and my represents the result of critical dimension measurement in y axis direction as shown in FIG. 30A. Represented by DH is design data of hole diameter of the hole pattern 89. Represented by k1 is the defect inspection result at a defect inspection area K1 as shown in FIG. 30B, being 1 for the presence of a defect and 0 for the absence of a defect, for example. Represented by α1 and α2 are contribution factors of the result of critical dimension measurement to the pattern formation state. Represented by β1 is a contribution factor of defect/foreign matter to the pattern formation state.

Figure 27:
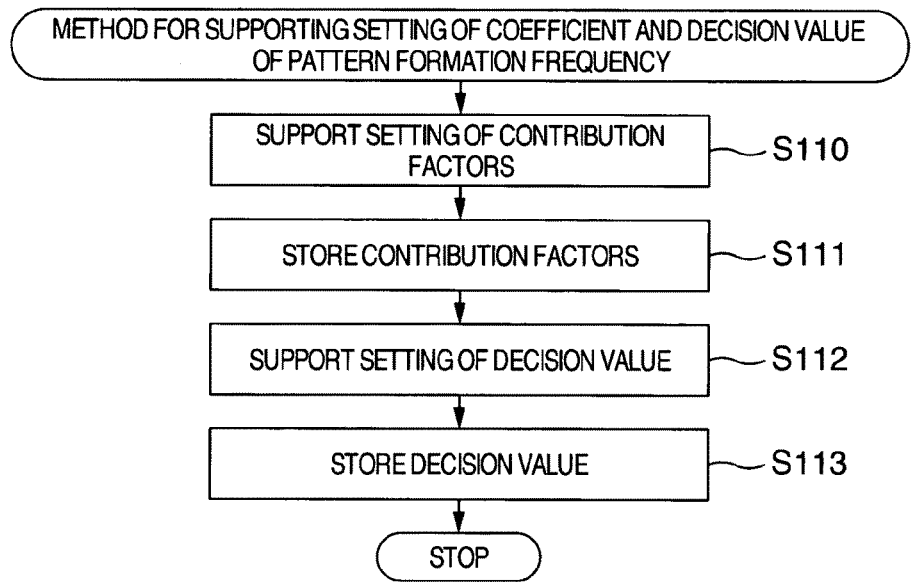
FIG. 27 is a flowchart of a method for supporting setting of coefficient and decision value of pattern formation frequency.

Illustrated in FIG. 27 is a flowchart of a method of supporting setting of coefficient and decision value in the pattern formation frequency. The flowchart is executed with the FIG. 5 decision value setting support unit 19. The FIG. 27 flowchart is executed to fulfill support of setting of the pattern formation frequency coefficient and decision value in the step S37 of FIG. 6.

As shown in FIG. 27, in step S110, the decision value setting support unit 19 first urges the user to set contribution factors α1 to α3 and β1 and β2 to the pattern formation frequency through the GUI or keyboard operation section.

In step S111, the decision value setting support unit 19 stores the thus set contribution factors α1 to α3 and β1 and β2 while having them related to the reference image.

In step S112, the decision value setting support unit 19 urges the user to set a decision value of pattern formation frequency through the GUI or keyboard operation section.

In step S113, the decision value setting support unit 19 stores the thus set decision value while having it related to the reference image.

Figure 28:
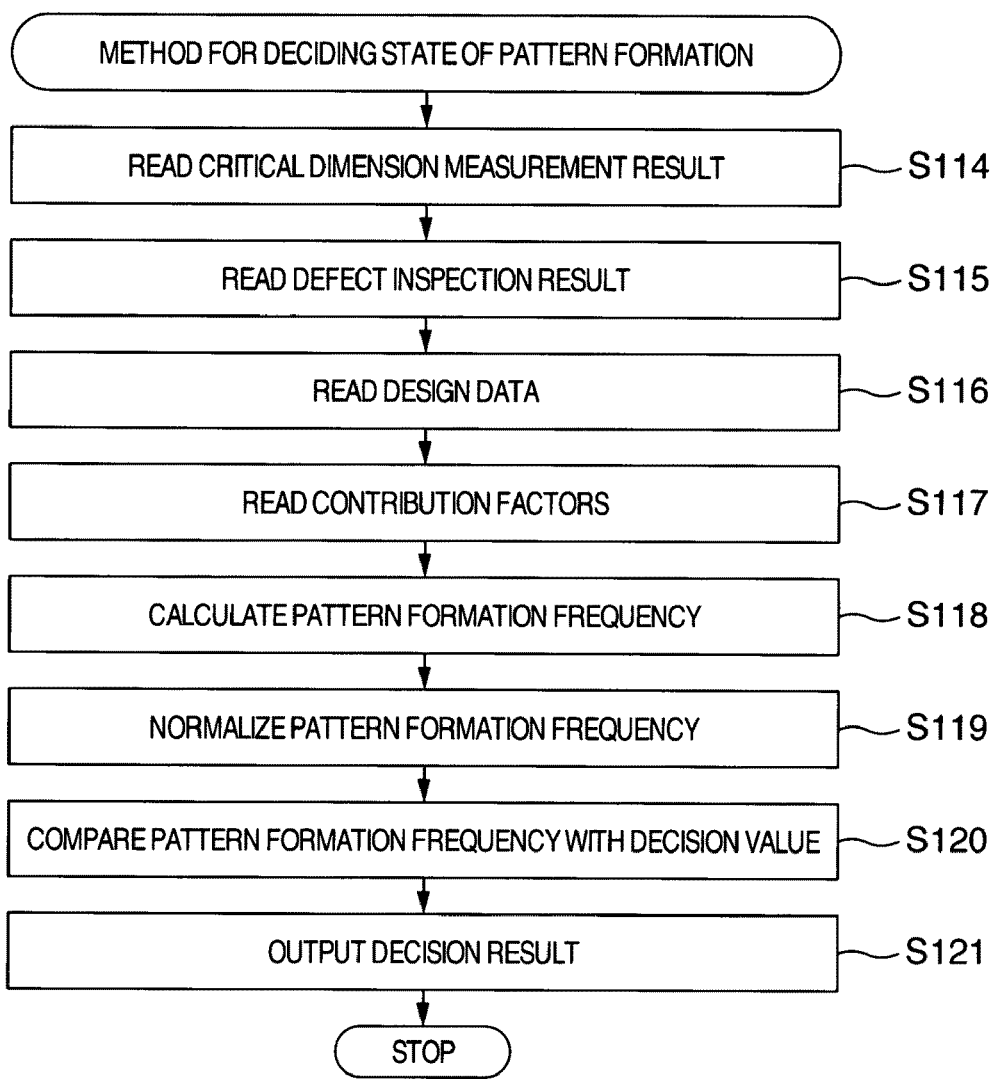
FIG. 28 is a flowchart of a method for deciding a pattern formation state.

Illustrated in FIG. 28 is a flowchart of a method of deciding the pattern formation state. The flowchart is executed with the decision unit 29 in FIG. 7. The FIG. 28 flow chart is executed to fulfill the decision of pattern formation state in the step S47 of FIG. 8.

As shown in FIG. 28, the decision unit 29 first reads critical dimension measurement results m1 to m3 and mx and my in step S114. The decision unit 29 reads in step S115 defect inspection results k1 and k2 (FIG. 29B) and k1 (FIG. 30B). In step S116, the decision unit 29 reads design data D1 to D3 and DH. In step S117, on the basis of the reference image, the decision unit 29 reads contribution factors α1 to α3 and β1 and β2. In step S118, the decision unit 29 calculates a pattern formation frequency. As necessary, in step S119, the thus calculated pattern formation frequency is normalized. By normalizing the pattern formation frequency calculated in this phase to a value such as a maximum of 1000, the statistical process can be facilitated. In step S120, the decision unit 29 reads a decision value of the pattern formation frequency and compares the pattern formation frequency with the decision value. In step S121, on the basis of the result of comparison, the decision unit 29 outputs a decision result. The decision result is displayed to the user from the critical dimension measurement result and the defect inspection result in respect of individual inspected images and therefore, the user can decide and evaluate the formation state of patterns in respect of each inspection pattern on the basis of the decision result alone.

As described above, according to the present embodiment, in a process of comparing an image of a normal pattern (reference image) with an image of a pattern (inspected image) representing an inspection target to detect the difference therebetween as a defect or abnormality, especially, in a process in which a variation stemming from the process has a large influence upon the size of a defect to be inspected, an inspection/non-inspection area can be set in an image under the consideration of characteristics of the pattern, so that a process variation attributable to the semiconductor production process and originally tolerable or permissible can be excluded and only a defect or abnormal part to be detected originally can be detected as a pattern defect/abnormality. Likewise, such an erroneous detection can be avoided that in spite of the absence of a defect, a process variation is detected as a defect. In addition, the result of conventional critical dimension measurement can be combined with the defect inspection result to assure the pattern shape evaluation.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A scanning electron microscope comprising:
    a reference image storage unit for storing a reference image in which a reference pattern having an edge part is included;

an inspected image pick-up unit for picking up, on the basis of the reference image, an inspected image in which an inspection pattern which matches with said reference pattern is included, wherein the inspected image pick-up unit carries out a pattern matching between the inspected image and the reference image;

a critical dimension measuring unit for measuring critical dimensions of said inspection pattern by using said inspected image;

a non-inspection area set-up unit which sets a non-inspection area including an edge part of a pattern in the inspected image and the reference image on which the pattern matching has been carried out; and a defect inspection unit for performing an inspection of a defect inside or outside said inspection pattern except the non-inspection area by comparing said reference image with said inspected image.

2. A scanning electron microscope according to claim 1, wherein said non-inspection area is a white band including the sidewalls of said reference pattern or said inspection pattern.

3. A scanning electron microscope according to claim 1, wherein said non-inspection area is an extracted area from which a deformed part in the inspection pattern, deformed from said reference pattern by a variation in production process of said reference pattern, is extracted.

4. A scanning electron microscope according to claim 1, wherein said non-inspection area set-up unit includes a display section for displaying said reference image or said inspected image, and a GUI which is used to arrange a patternized shape on said reference image or said inspected image displayed on said display section.

5. A scanning electron microscope according to claim 1, wherein said non-inspection area set-up unit includes an edge extraction section for extracting an edge part of said reference pattern or said inspection pattern, and an expansion section for expanding said edge part.

6. A scanning electron microscope according to claim 5, wherein said edge extraction section extracts said edge part on the basis of said reference image, inspected image, design data of said reference pattern or the result of said critical dimension measurement.

7. A scanning electron microscope according to claim 5, wherein said expansion section expands said edge part on the basis of a process variation tolerance value of production process of said inspection pattern.

8. A scanning electron microscope according to claim 1 further comprising a decision unit for deciding a state of formation of the inspection patterns from both the result of critical dimension measurement by said critical dimension measuring unit and the result of defect inspection of a defect inspection by said defect inspection unit.

9. A method for pattern composite inspection using a scanning electron microscope, comprising the steps of:

storing a reference image in which a reference pattern having an edge part is included, by means of the scanning electron microscope;

picking up, by means of said scanning electron microscope on the basis of said reference image, an inspected image in which an inspection pattern which pattern-matches with said reference pattern is included, wherein a pattern matching is carried out between the inspected image and the reference image;

measuring critical dimensions of said inspection pattern by using said inspected image;

setting a non-inspection area including an edge part of a pattern in the inspected image and the reference image on which the pattern matching has been carried out; and inspecting a defect inside or outside said inspection pattern except the non-inspection area by comparing said reference image with said inspected image.

* * * * *